(12) United States Patent
Nogawa

(10) Patent No.: US 9,848,062 B2
(45) Date of Patent: Dec. 19, 2017

(54) COMMUNICATION APPARATUS WHICH ESTABLISHES WIRELESS CONNECTION WITH EXTERNAL APPARATUS

(71) Applicant: Brother Kogyo Kabushiki Kaisha, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 98 days.

(21) Appl. No.: 14/843,223

(22) Filed: Sep. 2, 2015

(65) Prior Publication Data
US 2016/0066359 A1 Mar. 3, 2016

(30) Foreign Application Priority Data
Sep. 2, 2014 (JP) .................................. 2014-178065

(51) Int. Cl.
*H04B 7/00* (2006.01)
*H04L 29/08* (2006.01)
*H04W 84/20* (2009.01)

(52) U.S. Cl.
CPC .............. *H04L 67/36* (2013.01); *H04L 67/16* (2013.01); *H04W 84/20* (2013.01)

(58) Field of Classification Search
CPC ... H04W 40/24; H04W 76/02; H04W 76/025; H04W 88/04
USPC .......................... 370/310, 329, 341, 431, 437
See application file for complete search history.

(56) References Cited

U.S. PATENT DOCUMENTS

| | | | | |
|---|---|---|---|---|
| 8,391,260 B1* | 3/2013 | Kopikare | .............. | H04W 8/005 370/338 |
| 8,774,144 B2* | 7/2014 | Nogawa | ................ | H04W 48/18 370/252 |
| 9,294,545 B2* | 3/2016 | Desai | .................. | H04L 67/1093 |
| 9,332,061 B2* | 5/2016 | Taoka | ....................... | H04L 67/10 |
| 9,408,058 B2* | 8/2016 | Jung | ..................... | H04W 8/005 |
| 9,484,987 B2* | 11/2016 | Nishi | .................. | H04B 5/0031 |
| 9,521,271 B2* | 12/2016 | Lee | ........................ | G06F 3/1204 |
| 9,525,714 B2* | 12/2016 | Smadi | .............. | H04N 21/43615 |

(Continued)

FOREIGN PATENT DOCUMENTS

JP  2002-290414 A  10/2002

OTHER PUBLICATIONS

Wi-Fi Alliance Technical Committee P2P Task Group, "Wi-Fi Peer-to Peer (P2P) Technical Specification", Version 1.1, pp. 1-159. 2010.

*Primary Examiner* — Dmitry H Levitan
(74) *Attorney, Agent, or Firm* — Banner & Witcoff, Ltd.

(57) ABSTRACT

A communication apparatus may cause a display to display a first inquiry message in a case where an apparatus search signal is received from an external apparatus, the apparatus search signal being for searching a target apparatus which is to establish a wireless connection with the external apparatus, and the first inquiry message being for inquiring a user whether a particular wireless connection is to be established between the communication apparatus and the external apparatus. The communication apparatus may establish the particular wireless connection between the communication apparatus and the external apparatus in a case where it is selected by the user, in response to the first inquiry message, that the particular wireless connection is to be established.

13 Claims, 12 Drawing Sheets

(56) References Cited

U.S. PATENT DOCUMENTS

2009/0271709 A1* 10/2009 Jin .................. H04W 12/08
                                                    715/739
2013/0260683 A1   10/2013 Suzuki et al.

* cited by examiner (First Embodiment)

FIG. 5 (First Embodiment)

(Second Embodiment)

COMMUNICATION APPARATUS WHICH ESTABLISHES WIRELESS CONNECTION WITH EXTERNAL APPARATUS

CROSS-REFERENCE TO RELATED APPLICATION

This application claims priority to Japanese Patent Application No. 2014-178065, filed on Sep. 2, 2014, the contents of which are hereby incorporated by reference into the present application.

TECHNICAL FIELD

The present application discloses a communication apparatus capable of establishing a wireless connection with an external apparatus.

DESCRIPTION OF RELATED ART

Techniques for establishing a wireless connection between a first apparatus and a second apparatus according to a WFD (an abbreviation of Wi-Fi Direct) scheme are known. For instance, the first apparatus sends a Probe Request signal and receives, from each of one or more apparatuses including the second apparatus, a Probe Response signal including a device name or an SSID (an abbreviation of Service Set Identifier) of the apparatus. The first apparatus displays on a display unit of the first apparatus a list including one or more device names or SSIDs of one or more apparatuses. When a user selects information of the second apparatus from the list, a wireless connection is established between the first apparatus and the second apparatus.

SUMMARY

In the technique described above, when the list including one or more device names or SSIDs of one or more apparatuses is displayed on the display unit of the first apparatus, the user has to select the information on the second apparatus that is a target which is to establish a wireless connection with the first apparatus. However, for instance, for a user who lacks knowledge about wireless communication, it is difficult to appropriately select the information of the second apparatus from the list. Namely, for the user, it is difficult to establish a wireless connection between a pair of apparatuses (in other words, the first apparatus and the second apparatus). The present application provides a technique enabling a user to establish easily a wireless connection between an objective pair of apparatuses.

One aspect disclosed in the present specification may be a communication apparatus comprising: a display; a processor; and a memory storing computer-readable instructions therein, the computer-readable instructions, when executed by the processor, causing the communication apparatus to perform: causing the display to display a first inquiry message in a case where an apparatus search signal is received from an external apparatus, the apparatus search signal being for searching a target apparatus which is to establish a wireless connection with the external apparatus, and the first inquiry message being for inquiring a user whether a particular wireless connection is to be established between the communication apparatus and the external apparatus; and establishing the particular wireless connection between the communication apparatus and the external apparatus in a case where it is selected by the user, in response to the first inquiry message, that the particular wireless connection is to be established.

Moreover, a control method, a computer program, and a computer-readable recording medium that stores the computer program, all for realizing the communication apparatus, are also novel and useful. Further, a communication system comprising the communication apparatus and the external apparatus is also novel and useful.

EMBODIMENTS

First Embodiment

Configuration of Communication System 2

FIG. 1

Figure 1:
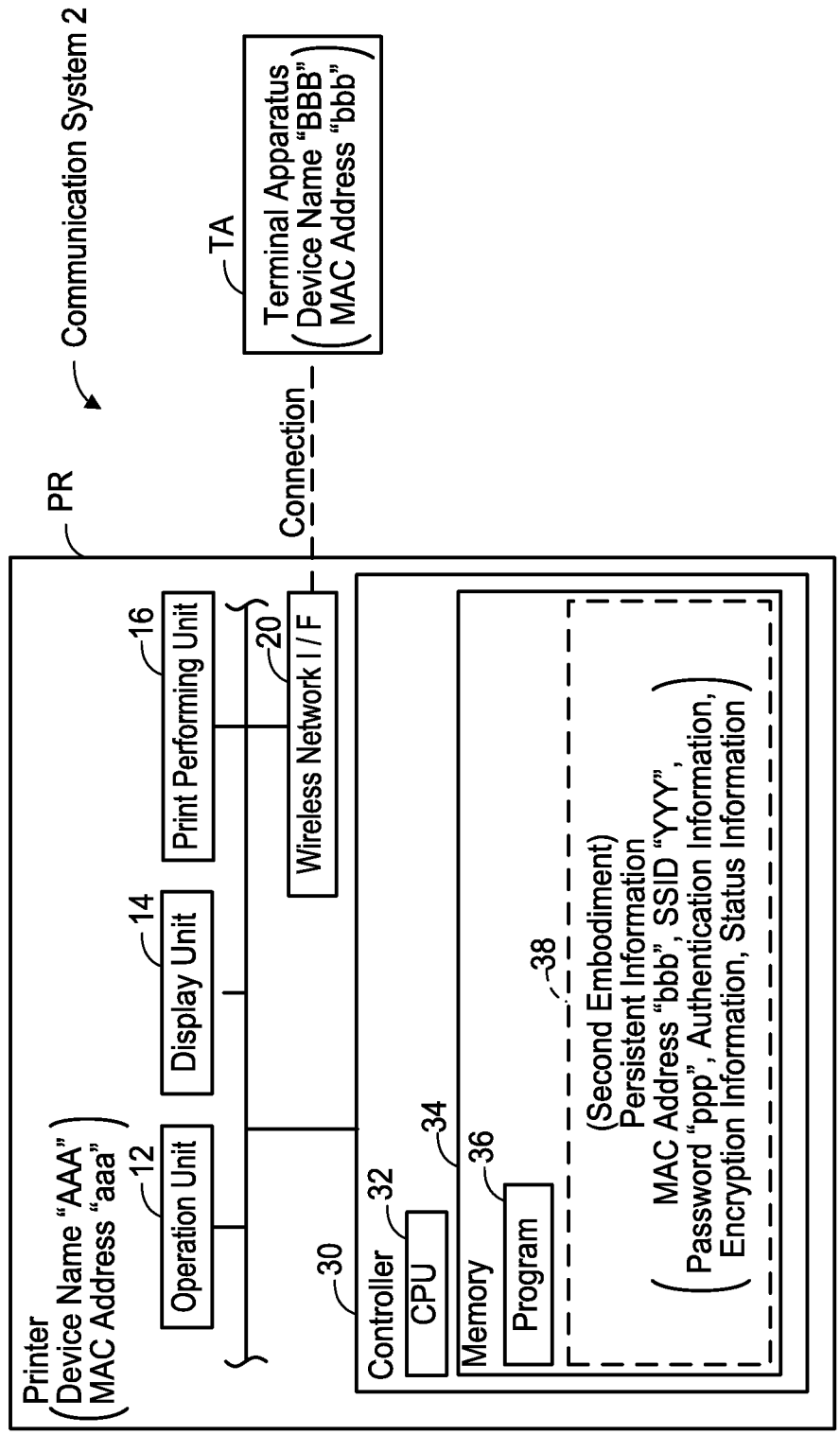
FIG. 1 illustrates a configuration of a communication system.

A communication system 2 comprises a printer PR and a terminal apparatus TA. Between the printer PR and the terminal apparatus TA can establish a wireless connection (hereinafter referred to as "connection"), and can execute wireless communication using the connection each other.

(Configuration of Printer PR)

The printer PR is a peripheral apparatus (namely, a peripheral apparatus of a terminal apparatus TA and such) capable of performing a printing function, and has a device name "AAA". The printer PR comprises: an operation unit 12; a display unit 14; a print performing unit 16; a wireless interface 20; and a controller 30. Hereinafter an interface is denoted as "I/F".

The operation unit 12 is constituted of a plurality of keys. A user may input various instructions into the printer PR by operating the operation unit 12. The display unit 14 is a display for displaying various kinds of information. The unit 14 also functions as a touch panel. The print performing unit 16 is a printing mechanism of an ink jet type, a laser type, and such.

A MAC address "aaa" is pre-allocated to the wireless network I/F 20. The wireless network I/F 20 is an interface for executing wireless communication (namely, WFD communication) according to the WFD scheme formulated by the Wi-Fi Alliance. The WFD scheme is a wireless communication system described in specifications "Wi-Fi Peer-to-Peer (P2P) Technical Specification Version1.1" prepared by the Wi-Fi Alliance. The details of the WFD scheme are also disclosed in U.S. Patent Application Publication No. 2013/0260683, and the document is quoted by referring. The controller 30 may perform the WFD communication through the wireless network I/F 20.

The controller 30 comprises: a CPU 32 and a memory 34. The CPU 32 is a processor that performs various processes according to a program 36 stored in the memory 34. The memory 34 is constituted of RAM, ROM, and such.

The printer PR is capable of operating in any one of states of a Group Owner state, a Client state, and a device state of the WFD scheme. Hereinafter the Group Owner state and the Client state are denoted as "G/O state" and "CL state", respectively. When the printer PR operates in the G/O state, the printer PR forms a WFD network (hereinafter referred to as "WFDNW"), establishes a connection with one or more external apparatuses (for instance, the terminal apparatus TA), and may allow the one or more external apparatuses to participate in the WFDNW. For instance, when an external apparatus is an apparatus that supports the WFD scheme (hereinafter referred to as "WFD apparatus"), the external apparatus operates in the CL state and participates in the WFDNW. For instance, when an external apparatus does not support the WFD scheme, namely, when the external apparatus is a legacy apparatus, the external apparatus participates in the WFDNW without operating in any state of the WFD scheme. Namely, the external apparatus participates in the WFDNW as a station. In a state where the printer PR operates in the G/O state, an upper limit number of connections that the printer PR may simultaneously establish is predetermined. Although, in the present embodiment, the upper limit number is "2", it may be some other value (for instance, "1", or equal to or more than "3"). When the printer PR operates in the CL state, the printer PR can establish a connection with an external apparatus operating in the G/O state, and can participate in the WFDNW formed by the external apparatus. The device state is neither the G/O state nor the CL state, namely, it is a state where the printer PR does not establish a connection with an external apparatus.

(Configuration of Terminal Apparatus TA)

The terminal apparatus TA, may be, for example, a portable apparatus such as a mobile phone, a smart phone, a notebook PC, and a tablet PC, and may be a stationary apparatus such as a desktop PC and a television. The terminal apparatus TA has a device name "BBB". A MAC address "bbb" is allocated to a wireless network I/F (an illustration is omitted) of the terminal apparatus TA. The terminal apparatus TA may be a WFD apparatus or a legacy apparatus.

Process of Printer PR

FIG. 2

Figure 2:
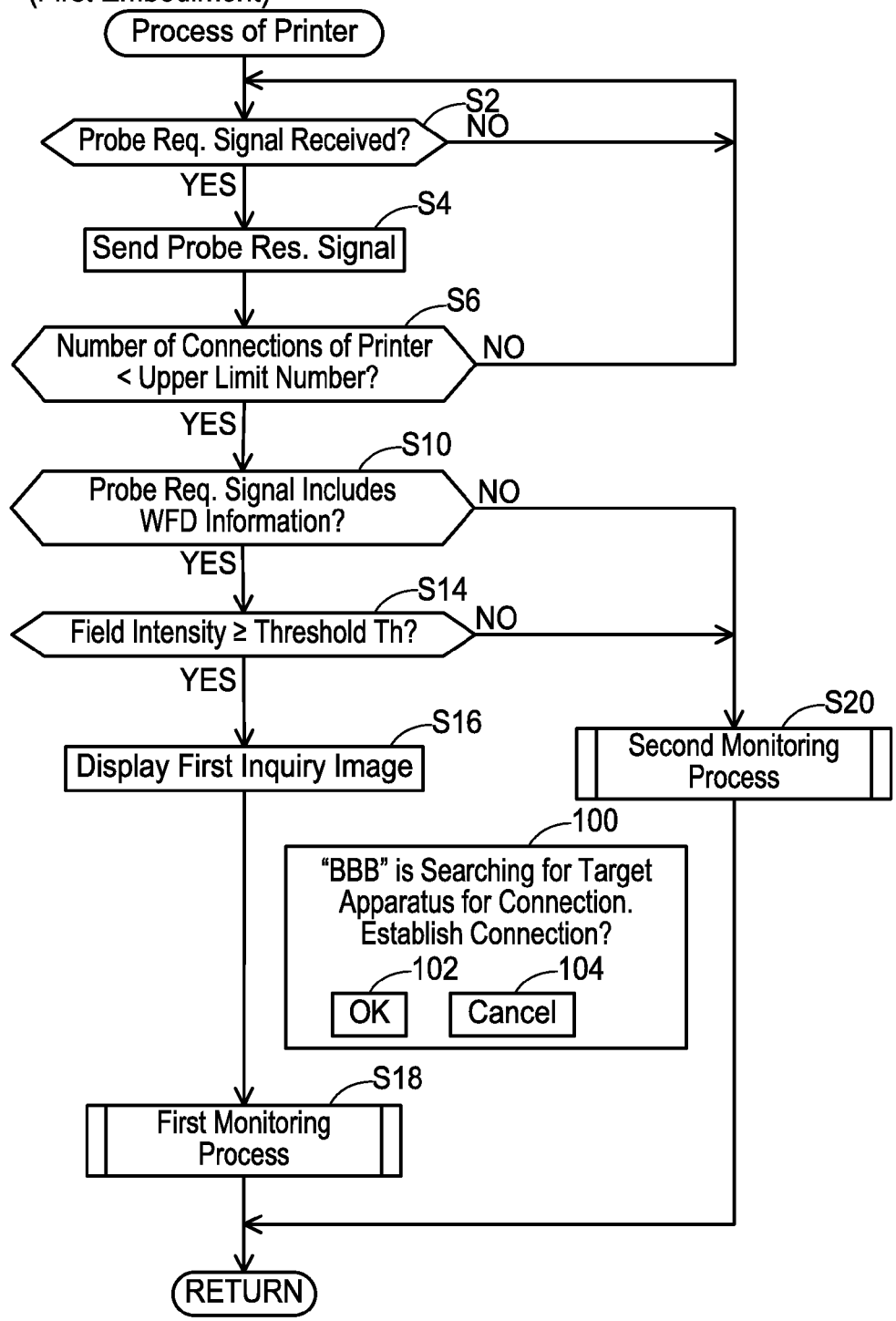
FIG. 2 illustrates a flow chart of a process performed by a printer.

Next, with reference to FIG. 2, content of a process performed by the CPU 32 of the printer PR is described. The process is performed with a power supply of the printer PR being turned ON as a trigger.

In S2, the CPU 32 monitors that a Probe Request signal is received from the terminal apparatus TA through the wireless network I/F 20. The Probe Request signal is a signal sent from the terminal apparatus TA when, in the terminal apparatus TA, a search operation is performed by a user to search an apparatus, which is to establish connection with the terminal apparatus TA. When the terminal apparatus TA is a WFD apparatus, the Probe Request signal includes WFD information indicating that the terminal apparatus TA supports the WFD scheme and the device name "BBB" of the terminal apparatus TA. On the other hand, when the terminal apparatus TA is a legacy apparatus, the Probe Request signal includes the device name "BBB" but does not include the WFD information. When receiving the Probe Request signal from the terminal apparatus TA (YES in S2), the CPU 32 proceeds to S4. When the Probe Request signal is received, the printer PR is either a G/O apparatus operating in the G/O state or a device apparatus operating in the device state. Namely, the printer PR, in a case of being a CL apparatus operating in the CL state, does not receive the Probe Request signal from the terminal apparatus TA. Hereinafter a Request is denoted as "Req." Since all communications performed by the printer PR is performed via the wireless network I/F 20, the description "via the wireless network I/F 20" is omitted.

In S4, the CPU 32 sends the Probe Response signal to the terminal apparatus TA. In a case where the printer PR is a G/O apparatus, in the memory 34, a password, an SSID "XXX", an authentication method, an encryption method, and such (hereinafter referred to as "password and such") currently being used in the WFDNW formed by the printer PR are stored. In a case where the printer PR is a G/O apparatus, the Probe Response signal includes the SSID "XXX" for distinguishing the WFDNW in the memory 34. On the other hand, in a case where the printer PR is a device apparatus, the Probe Response signal includes the device name "AAA" of the printer PR. Hereinafter a Response is referred to as "Res.".

In S6, the CPU 32 determines whether the number of wireless connections currently established by the printer PR (hereinafter referred to as "the number of connections") is less than "2", which is the upper limit number. In a case where the printer PR is a G/O apparatus and the number of connections is less than the upper limit number, the CPU 32 determines YES in S6 and proceeds to S10. In a case where the printer PR is a device apparatus, namely, in a case where the number of connections is "0", the CPU 32 determines YES in S6, and proceeds to S10. On the other hand, in a case where the printer PR is a G/O apparatus and the number of connections is the upper limit number, the CPU 32 determines NO in S6, and returns to S2 without performing processes of S10 onward.

In S10, the CPU 32 determines whether the Probe Req. signal received in S2 includes the WFD information. In a case where determining that the Probe Req. signal includes the WFD information (YES in S10), the CPU 32 proceeds to S14. On the other hand, in a case of determining that the Probe Req. signal does not include the WFD information (NO in S10), proceeds to S20, the CPU 32 performs a second monitoring process (refer to FIG. 5). The CPU 32 returns to S2 after finishing S20.

In S14, the CPU 32 determines whether field intensity of a carrier wave used in communication of the Probe Req. signal received in S2 is equal to or more than a threshold Th. In a case of determining that the field intensity is equal to or more than threshold Th (YES in S14), the CPU 32 proceeds to S16. On the other hand, in a case of determining that the field intensity is less than the threshold Th (NO in S14), the CPU 32 proceeds to S20.

In S16, the CPU 32 displays a first inquiry image 100 on the display unit 14. The first inquiry image 100 includes: a message reporting a user that the terminal apparatus TA having the device name "BBB" included in the Probe Req. signal received in S2 is searching for a target apparatus for connection; and a message inquiring the user whether to establish a connection between the printer PR and the terminal apparatus TA. The first inquiry image 100 includes an OK button 102 for selecting to establish a connection and a Cancel button 104 for selecting not to establish a connection.

Figure 3:
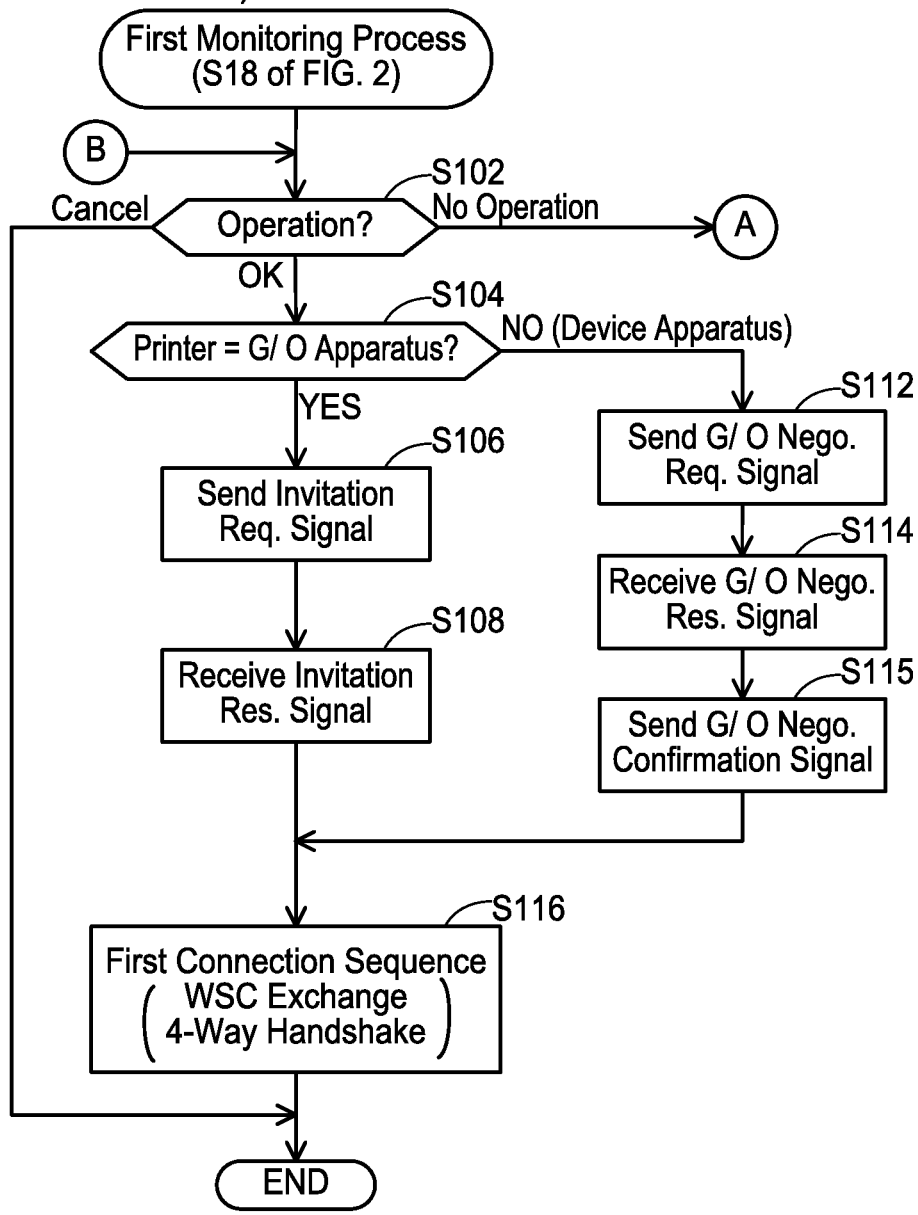
FIG. 3 illustrates a flow chart of a first monitoring process.
Figure 4:
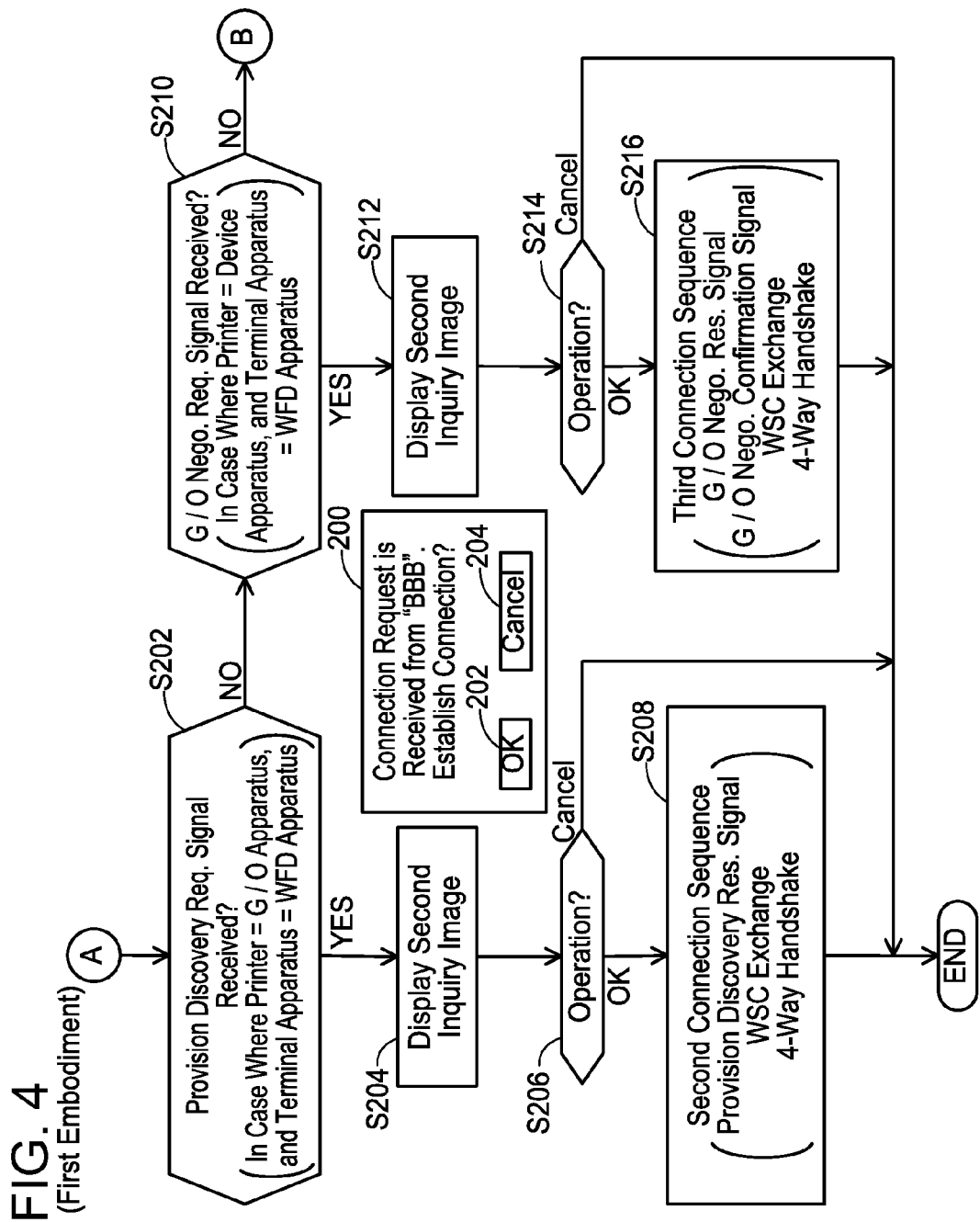
FIG. 4 illustrates a flow chart following the first monitoring process.

Next, in S18, the CPU 32 performs a first monitoring process (refer to FIG. 3 and FIG. 4). The CPU 32 returns to S2 after finishing S18.

As described above, the printer PR, in a case where the Probe Req. signal includes the WFD information (YES in S10), namely, when the terminal apparatus TA is a WFD apparatus, displays the first inquiry image 100. Although the details are described later, in a case where the OK button 102 in the first inquiry image 100 is selected, the Invitation Req. signal or a G/O Negotiation Req. signal is sent from the printer PR to the terminal apparatus TA (refer to S106 and S112 of FIG. 3). As a result, the printer PR can appropriately establish a connection with the terminal apparatus TA, which is a WFD apparatus. On the other hand, the printer PR, in a case where the Probe Req. signal does not include the WFD information (NO in S10), namely, the terminal apparatus TA is a legacy apparatus, does not display the first inquiry image 100. A legacy apparatus can not execute a process in response to the above Invitation Req. signal or the G/O Negotiation Req. signal. Supposing that the terminal apparatus TA is a legacy apparatus, when the first inquiry image 100 is displayed, the user may possibly select the OK button 102 in the first inquiry image 100. In this case, a signal (namely, the Invitation Req. signal or the G/O Negotiation Req. signal), to which the terminal apparatus TA which is a legacy apparatus can respond, is sent to the terminal apparatus TA. In the present embodiment, since the first inquiry image 100 is not displayed, the sending of a signal to which the terminal apparatus TA which is a legacy apparatus can not respond, may be suppressed to be sent.

The printer PR, in a case where the field intensity of the carrier wave used in the communication of the Probe Req. signal is equal to or more than the threshold Th (YES in S14), displays the first inquiry image 100, and in a case where the field intensity is less than the threshold Th (NO in S14), does not display the first inquiry image 100. For instance, when a distance between the printer PR and the terminal apparatus TA is small, the field intensity becomes equal to or more than the threshold Th, and, when the distance between the printer PR and the terminal apparatus TA is large, the field intensity becomes less than the threshold Th. For instance, a user of the terminal apparatus TA, in a case of printing of an image represented by data in the terminal apparatus TA is to be performed, generally desires to use a printer existing near the terminal apparatus TA. Considering such a demand, the printer PR, in a situation where the terminal apparatus TA is existing near the printer PR, namely, in a situation where the field intensity is equal to or more than the threshold Th, displays the first inquiry image 100. Therefore, the user, by selecting the OK button 102 in the first inquiry image 100, may establish a connection between the terminal apparatus TA and the printer PR near the terminal apparatus TA (refer to S116 and such of FIG. 3 described later), as a result, can allow the printer PR to perform printing. On the other hand, the printer PR, in a situation where the terminal apparatus TA is not existing near the printer PR, namely, in a situation where the field intensity is less than the threshold Th, does not display the first inquiry image 100. Therefore, for instance, it is possible to suppress a third party, which is different from the user of the terminal apparatus TA, from mistakenly selecting the OK button 102 in the first inquiry image 100 displayed on the printer PR positioned away from the terminal apparatus TA. Namely, to establish a connection between the terminal apparatus TA and the printer PR is suppressed even though the user of the terminal apparatus TA does not desire to use the printer PR.

First Monitoring Process

FIG. 3

Next, with reference to FIG. 3, content of the first monitoring process executed in S18 of FIG. 2 is described. In S102, the CPU 32 monitors that operation is performed by the user in response to the first inquiry image 100. In a case where the touch panel of the display unit 14 is operated by the user and the OK button 102 is selected, the CPU 32 proceeds to S104, and, in a case where the Cancel button 104 is selected, the CPU 32 finishes the first monitoring process. In a case where neither the OK button 102 nor the Cancel button 104 is selected by the user, the CPU 32 proceeds to S202 of FIG. 4.

In S104, the CPU 32 determines whether the printer PR is a G/O apparatus. In a case of determining that the printer PR is a G/O apparatus (YES in S104), the CPU 32 proceeds to S106. On the other hand, in a case of determining that the printer PR is a device apparatus (NO in S104), the CPU 32 proceeds to S112.

In S106, the CPU 32 sends the Invitation Req. signal to the terminal apparatus TA. The Invitation Req. signal is a signal for inviting the terminal apparatus TA as a CL apparatus of the WFDNW formed by the printer PR. In S108, the CPU 32 receives the Invitation Res. signal, which is a response signal of the Invitation Req. signal from the terminal apparatus TA.

Next, in S116, the CPU 32 executes a first connection sequence with the terminal apparatus TA, and executes a connection with the terminal apparatus TA. Specifically, the CPU 32 performs a WCS Exchange with the terminal apparatus TA. In S116 executed through S108, the printer PR is a G/O apparatus, and the password and such currently used in the WFDNW formed by the printer PR are stored in the memory 34. The CPU 32 sends the password and such in the memory 34 to the terminal apparatus TA in the WCS Exchange. Next, the CPU 32 executes authentication by executing a 4-Way Handshake with the terminal apparatus TA. Because of this, the CPU 32 allows the terminal apparatus TA to participate as a CL apparatus in the WFDNW formed by the printer PR. When S116 is finished, the first monitoring process is finished.

On the other hand, in S112, the CPU 32 sends the G/O Negotiation Req. signal including an Intent value representing a G/O priority of the printer PR, to the terminal apparatus TA. Next, in S114, the CPU 32 receives the G/O Negotiation Res. signal including the Intent value representing the G/O priority of the terminal apparatus TA, from the terminal apparatus TA. The Intent value of the printer PR is an index to indicate a degree with which the printer PR is to be a G/O apparatus, and is predetermined in the printer PR. Similarly, the Intent value of the terminal apparatus TA is an index to indicate a degree with which the terminal apparatus TA is to be a G/O apparatus, and is predetermined in the terminal apparatus TA. The CPU 32 compares the Intent value of the printer PR and the Intent value of the terminal apparatus TA, determines that an apparatus with a larger Intent value is to be a G/O apparatus, and determines that an apparatus with a smaller Intent value is to be a CL apparatus. Hereinafter Negotiation is denoted as "Nego.".

In S115, the CPU 32 sends a G/O Nego. Confirmation signal to the terminal apparatus TA. The G/O Nego. Confirmation signal includes information regarding which of the printer PR and the terminal apparatus TA is to be a G/O apparatus. As described above, communication of the G/O Nego. Req. signal, the G/O Nego. Res. signal, and the G/O Nego. Confirmation signal is communication so-called G/O negotiation and is operation-determining communication to determine as which of a G/O apparatus and a CL apparatus the printer PR is to operate.

The CPU 32 shifts an operating state of the printer PR from the device state to the G/O state or the CL state according to a result of the G/O negotiation. The terminal apparatus TA, in a case of receiving the G/O Nego. Confirmation signal from the printer PR, shifts the operating state of the terminal apparatus TA from the device state to the CL state or the G/O state according to information represented by the G/O Nego. Confirmation signal. In a case where the operating state of the printer PR is shifted to the G/O state, the CPU 32 forms the WFDNW in which the printer PR operates as a G/O apparatus. In this case, the CPU 32 generates a password and such to be used in the WFDNW, and stores these kinds of information in the memory 34. On the other hand, in a case where the operating state of the printer PR is shifted to the CL state, the terminal apparatus TA forms the WFDNW in which the terminal apparatus TA operates as a G/O apparatus.

Next, in S116 performed through S115, the CPU 32 executes the first connection sequence according to the operating state of the printer PR with the terminal apparatus TA, and establishes a connection with the terminal apparatus TA. A case where the printer PR is a G/O apparatus is similar to S116 executed through S108. In a case where the printer PR is a CL apparatus, the CPU 32 receives, from the terminal apparatus TA in the WCS Exchange, the password and such to be used in the WFDNW formed by the terminal apparatus TA. The CPU 32, then, executes the authentication by executing the 4-Way Handshake with the terminal apparatus TA. Because of this, in a case where the printer PR is a CL apparatus, the CPU 32 allows the printer PR to participate as a CL apparatus in the WFDNW in which the terminal apparatus TA operates as a G/O apparatus. When S116 is finished, the first monitoring process is finished.

Continuation of the First Monitoring Process

FIG. 4

Next, with reference to FIG. 4, a process is described in a case where the OK button 102 or the Cancel button 104 is not selected in response to the first inquiry image 100. In S202, the CPU 32 monitors that a Provision Discovery Req. signal is received from the terminal apparatus TA. The Provision Discovery Req. signal is a signal for confirming a WPS (an abbreviation of Wi-Fi Protected Setup) scheme (for instance, a push button method, a PIN code method, and such). In a case where the printer PR is a G/O apparatus and the terminal apparatus TA is a WFD apparatus, the Provision Discovery Req. signal may be received in S202. In a case where the Provision Discovery Req. signal is received from the terminal apparatus TA (YES in S202), the CPU 32 proceeds to S204. On the other hand, in a case where the Provision Discovery Req. signal is not received from the terminal apparatus TA (NO in S202), the CPU 32 proceeds to S210.

The following is a situation where the Provision Discovery Req. signal is received from the terminal apparatus TA, which is a WFD apparatus. The printer PR, which is a G/O apparatus, received the Probe Req. signal from the terminal apparatus TA (YES in S2 of FIG. 2), and sent, to the terminal apparatus TA, the Probe Res. signal including the SSID "XXX" of the WFDNW formed by the printer PR (S4). In a case where one or more apparatuses, which are G/O apparatuses or device apparatuses, other than the printer PR exist around the terminal apparatus TA, the terminal apparatus TA receives the Probe Res. signals including the device names or the SSIDs of the one or more apparatuses from the one or more apparatuses. The terminal apparatus TA displays the selection display including the SSID "XXX". The selection display may include the device names or the SSIDs of the one or more apparatuses. The terminal apparatus TA, in a case where the SSID "XXX" is selected by the user on the selection display, sends the Provision Discovery Req. signal to the printer PR. Thereby, the Provision Discovery Req. signal is received from the terminal apparatus TA.

In S204, the CPU 32 displays a second inquiry image 200 on the display unit 14 in place of the first inquiry image 100 displayed in S16 of FIG. 2. The second inquiry image 200 includes: a message for notifying a user that a connection request has been received from the terminal apparatus TA having the device name "BBB"; and a message for inquiring with the user about whether to establish a connection between the printer PR and the terminal apparatus TA. The second inquiry image 200 includes an OK button 202 for selecting to establish a connection and a Cancel button 204 for selecting not to establish a connection. In S206, the CPU 32 specifies an operation performed by the user in response to the second inquiry image 200. In a case where the touch panel of the display unit 14 is operated by the user and the OK button 202 is selected, the CPU 32 proceeds to S208, and, in a case where the Cancel button 204 is selected, finishes the first monitoring process. In the present embodiment, although the CPU 32 displays the second inquiry image 200 in place of the first inquiry image 100 on the display unit 14, the second inquiry image 200 may be further displayed on the display unit 14 while maintaining a state where the first inquiry image 100 is displayed on the display unit 14.

In S208, the CPU 32 executes the second connection sequence with the terminal apparatus TA, and establishes a connection with the terminal apparatus TA. Specifically, the CPU 32 sends the Provision Discovery Res. signal, which is a response signal to the Provision Discovery Req. signal, to the terminal apparatus TA. Next, the CPU 32 executes the WCS Exchange and the 4-Way Handshake with the terminal apparatus TA. Since the printer PR is a G/O apparatus, the CPU 32 sends, to the terminal apparatus TA, in the WCS Exchange the password and such in the memory 34 currently used in the WFDNW formed by the printer PR. Thereby, the CPU 32 can allow the terminal apparatus TA to participate as a CL apparatus in the WFDNW in which the printer PR operates as a G/O apparatus. When S208 is finished, the first monitoring process is finished.

In S210, the CPU 32 monitors that the G/O Nego. Req. signal including the Intent value representing the G/O priority of the terminal apparatus TA is received from the terminal apparatus TA. In a case where the printer PR is a device apparatus and the terminal apparatus TA is a WFD apparatus, the G/O Nego. Req. signal may be received in S210. In a case where the G/O Nego. Req. signal is received from the terminal apparatus TA (YES in S210), the CPU 32 proceeds to S212. In a case where neither the Provision Discovery Req. signal nor the G/O Nego. Req. signal is received from the terminal apparatus TA (NO in S210), the CPU 32 returns to S102 of FIG. 3.

A situation where the G/O Nego. Req. signal is received from the terminal apparatus TA, which is a WFD apparatus, is as follows. The printer PR, which is a device apparatus, received the Probe Req. signal from the terminal apparatus TA (YES in S2 of FIG. 2), and sent the Probe Res. signal including the device name "AAA" of the printer PR to the terminal apparatus TA (S4). Next, the terminal apparatus TA displays the selection display including the device name "AAA". Similarly as described in S204, the selection display may further include the device names or the SSIDs of the one or more apparatuses. The terminal apparatus TA, in a case where the device name "AAA" is selected by the user in the selection display, sends the G/O Nego. Req. signal to the printer PR. Thereby, the G/O Nego. Req. signal may be received from the terminal apparatus TA.

S212 and S214 are similar to S204 and S206. In S216, the CPU 32 establishes a connection with the terminal apparatus TA by executing a third connection sequence with the terminal apparatus TA. Specifically, the CPU 32 sends the G/O Nego. Res. signal including the Intent value representing the G/O priority of the printer PR to the terminal apparatus TA. The CPU 32 receives, from the terminal apparatus TA, the G/O Nego. Confirmation signal including information indicating which of the printer PR and the terminal apparatus TA is to be a G/O apparatus. The CPU 32 shifts the operating state of the printer PR from the device state to the G/O state or the CL state according to a result of the G/O negotiation. Each process thereafter according to the operating state of the printer PR is similar to each process described in S116 of FIG. 3. When S216 is finished, the first monitoring process is finished.

Second Monitoring Process

FIG. 5

Figure 5:
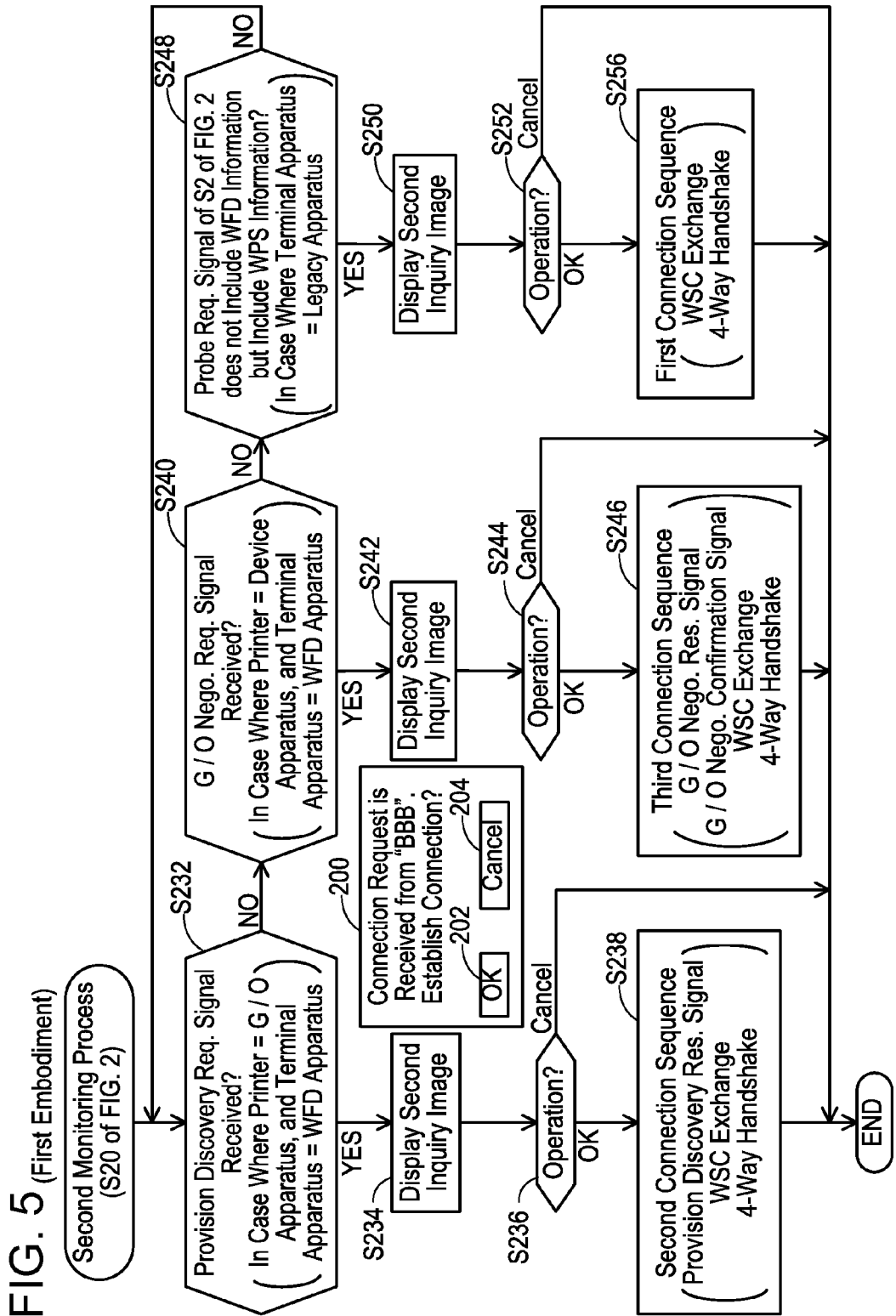
FIG. 5 illustrates a flow chart of a second monitoring process.

Next, with reference to FIG. 5, content of the second monitoring process executed in S20 of FIG. 2 is described. S232 to S246 are similar to S202 to S216 of FIG. 4. However, in S234 and S242, the second inquiry image 200 is not displayed in place of the first inquiry image 100, but the second inquiry image 200 is displayed in a state where the first inquiry image 100 is not displayed.

In S248, the CPU 32 determines whether the Probe. Req. signal received in S2 of FIG. 2 does not include the WFD information and includes WPS information. The WPS information is information representing that an apparatus of a sender of the Probe. Req. signal is executing a process according to the WPS scheme. In case where the Probe. Req. signal includes the WPS information, it is highly likely that the user desires a connection is to be established between the apparatus of the sender of the Probe. Req. signal and an apparatus of a destination. When the printer PR is a G/O apparatus or a device apparatus and the terminal apparatus TA is a legacy apparatus, the Probe. Req. signal received in S2 does not include the WFD information but includes the WPS information. In a case where the Probe. Req. signal received in S2 does not include the WFD information and includes the WPS information (YES in S248), the CPU 32 proceeds to S250. On the other hand, tin a case where the Probe. Req. signal received in S2 includes the WFD information, or, in a case where the Probe. Req. signal does not include the WPS information (NO in S248), the CPU 32 returns to S232.

S250 and S252 are similar to S234 and S236. In S256, the CPU 32 establishes a connection with the terminal apparatus TA by executing the first connection sequence with the terminal apparatus TA. Specifically, in a case where the operating state of the printer PR is the device state, the CPU 32 shifts the operating state of the printer PR from the device state to the G/O state, and forms the WFDNW. In a case where the operating state of the printer PR is the G/O state, the WFDNW has been formed. The CPU 32 executes the WCS Exchange and the 4-Way Handshake with the terminal apparatus TA. A process of executing the WCS Exchange and the 4-Way Handshake is similar to the process described in S116 of FIG. 3. When S256 is finished, the second monitoring process is finished.

Specific Cases

FIG. 6 to FIG. 9

Next, with reference to FIG. 6 to FIG. 9, content of specific cases A to D achieved in accordance with flow charts in FIG. 2 to FIG. 5 is described. In any of the cases A to D, the terminal apparatus TA is a WFD apparatus and is in the device state. In any of the cases A to D, although an illustration is omitted, a specific apparatus having a device name "CCC" exists around the terminal apparatus TA.

Case A

FIG. 6

In this case, the printer PR is a G/O apparatus, and forms the WFDNW having the SSID "XXX". The number of connections of the printer PR is less than the upper limit number. In T2, the user performs a search operation in the terminal apparatus TA. In T4, the terminal apparatus TA sends the Probe Req. signal including the WFD information and the device name "BBB" of the terminal apparatus TA.

The printer PR, when receiving the Probe Req. signal from the terminal apparatus TA (YES in S2 of FIG. 2), in T6, sends the Probe Res. signal including the SSID "XXX" to the terminal apparatus TA (S4).

The terminal apparatus TA receives the Probe Res. signal from the printer PR and further receives the Probe Res. signal including the device name "CCC" of the specific apparatus from the specific apparatus existing around the terminal apparatus TA. In this case, in T8, the terminal apparatus TA displays a selection display 300 including the SSID "XXX" and the device name "CCC".

In T10, the printer PR determines that the Probe Req. signal of T4 includes the WFD information (YES in S10). Next, the printer PR determines that, in T12, field intensity of a carrier wave used in communication of the Probe Req. signal is equal to or more than the threshold Th (YES in S14), and in T14, displays the first inquiry image 100 (refer to FIG. 2) (S16). In T16, the user selects the OK button 102 (refer to FIG. 2) (OK in S102 of FIG. 3) in response to the first inquiry image 100. In this case, in T18, the printer PR sends an Invitation Req. signal to the terminal apparatus TA (YES in S104, S106).

The terminal apparatus TA, when receiving the Invitation Req. signal from the printer PR, in T20, displays a third inquiry image 400. The third inquiry image 400 includes: a message for notifying the user that a connection request has been received from the apparatus having the device name "AAA" (namely, the printer PR); and a message for inquiring with the user about whether to establish a connection between the printer PR and the terminal apparatus TA. The third inquiry image 400 includes an OK button 402 for selecting to establish a connection and a Cancel button 404 for selecting not to establish a connection. In T22, the user selects the OK button 402 in response to the third inquiry image 400. In this case, in T24, the terminal apparatus TA sends the Invitation Res. signal to the printer PR, and shifts to the CL state.

The printer PR, in a case of receiving the Invitation Res. signal from the terminal apparatus TA (S108), in T26, executes the first connection sequence with the terminal apparatus TA, and establishes a connection with the terminal apparatus TA (S116). Because of this, the printer PR can allow the terminal apparatus TA to participate as a CL apparatus in the WFDNW in which the printer PR operates as a G/O apparatus. In this way, in a state where the printer PR and the terminal apparatus TA belong to a same WFDNW, the printer PR by using the WFDNW, for example, receives an image file from the terminal apparatus TA, and performs printing of an image represented by the image file.

As described above, the printer PR, when the Probe Req. signal is received from the terminal apparatus TA (T4), displays the first inquiry image 100 (refer to FIG. 2) for inquiring with the user about whether to establish a connection between the printer PR and the terminal apparatus TA (T14). The printer PR, in a case where the OK button 102 (refer to FIG. 2) is selected by the user in response to the first inquiry image 100 (T16), establishes a connection between the printer PR and the terminal apparatus TA (T18, T24, T26).

Supposing, in T14, a configuration in which the printer PR does not display the first inquiry image 100 is adopted, the user is required to select the SSID "XXX" in the selection display 300 displayed in T8 for establishing a connection between the printer PR and the terminal apparatus TA. However, a user who lacks knowledge about the wireless communication finds it difficult to select the SSID "XXX" in the selection display 300 and may possibly select the device name "CCC" by mistake. Namely, it is difficult for the user to establish a connection between the printer PR and the terminal apparatus TA. On the contrary, in the present embodiment, the user is just required to select the OK button 102 in the first inquiry image 100 for establishing a connection between the printer PR and the terminal apparatus TA and to select the OK button 402 in the third inquiry image 400. Namely, since the user is not required to select the SSID "XXX" in the selection display 300, the user can easily establish a connection between the printer PR and the terminal apparatus TA. Especially, in the case A, the user can easily establish a connection between the printer PR, which is a G/O apparatus, and the terminal apparatus TA.

Case B

FIG. 7

In this case, the printer PR is a device apparatus. T102, T104 are similar to T2, T4 of FIG. 6. The printer PR, in a case of receiving the Probe Req. signal from the terminal apparatus TA (YES in S2 of FIG. 2), in T106, sends the Probe Res. signal including the device name "AAA" of the printer PR to the terminal apparatus TA (S8).

In T108, the terminal apparatus TA displays the selection display 310 including the device name "AAA" and the device name "CCC".

Figure 6:
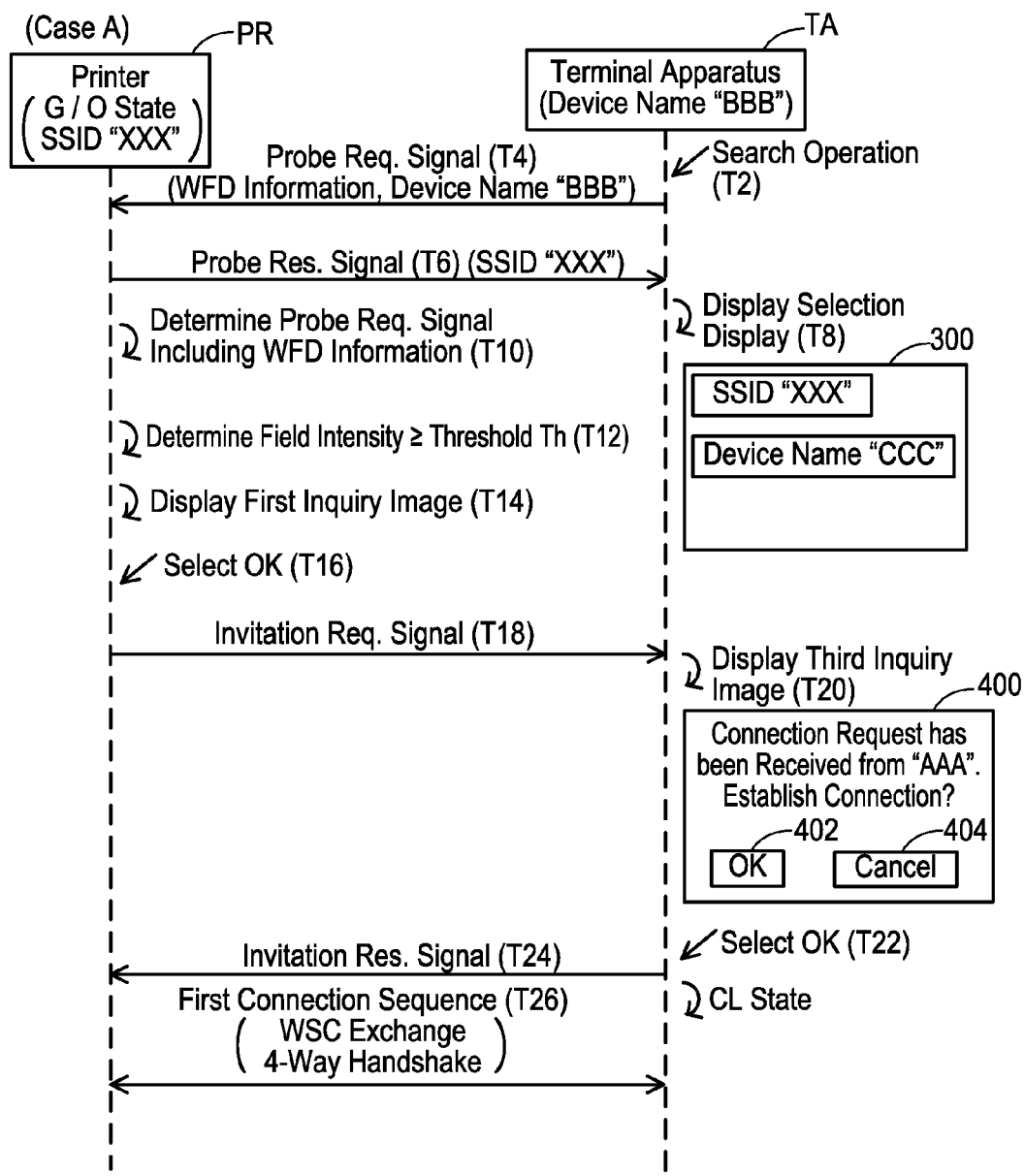
FIG. 6 illustrates a sequence diagram of a case A where the printer is in a G/O state.
Figure 7:
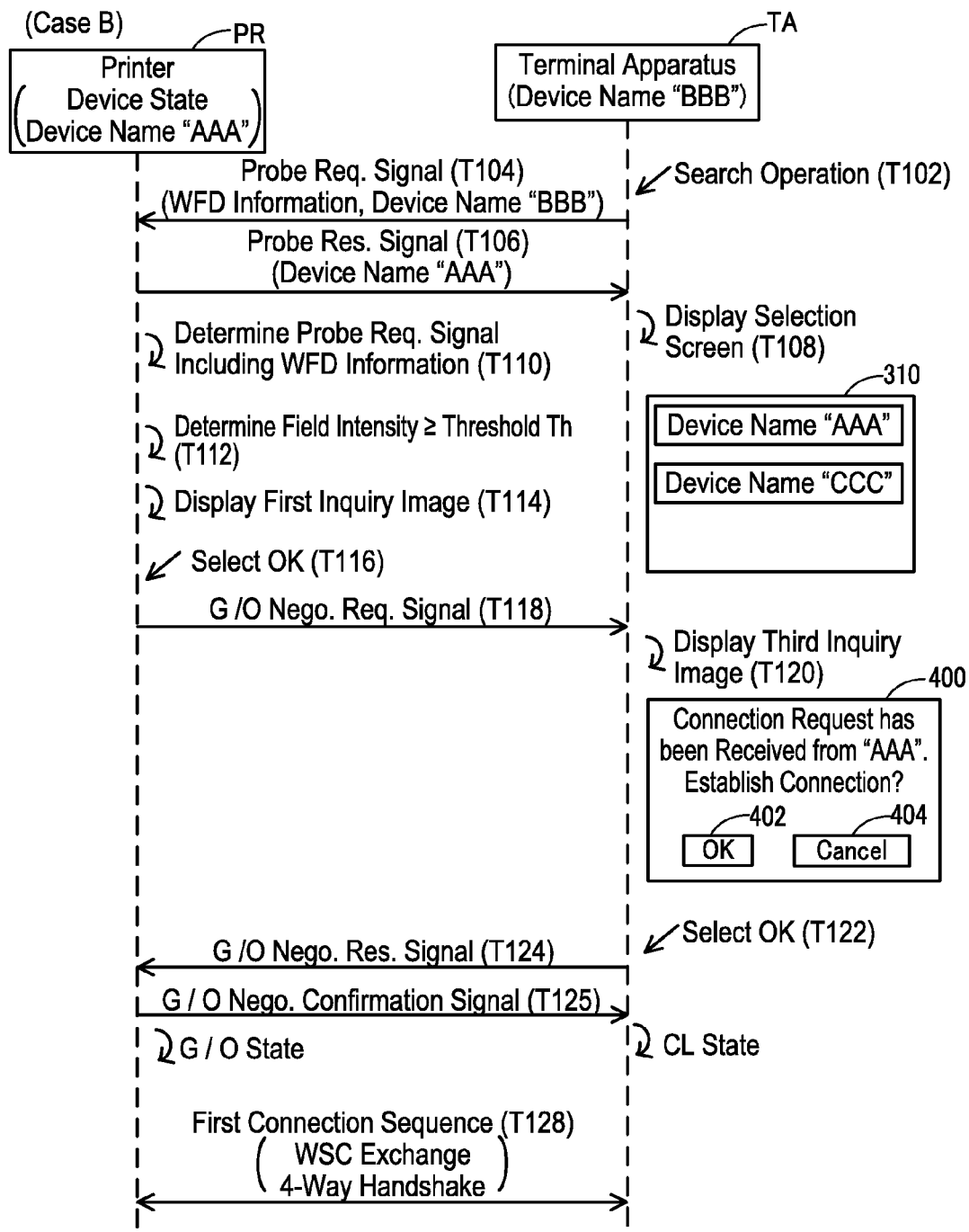
FIG. 7 illustrates a sequence diagram of a case B where the printer is in a device state.

T110 to T116 are similar to T10 to T16 of FIG. 6. In T118, the printer PR sends the G/O Nego. Req. signal to the terminal apparatus TA (NO in S104, S112).

T120, T122 are similar to T20, 22 of FIG. 6. In T124, the terminal apparatus TA sends the G/O Nego. Res. signal to the printer PR.

The printer PR, when receiving the G/O Nego. Res. signal from the terminal apparatus TA (S114), in T125, sends the G/O Nego. Confirmation signal to the terminal apparatus TA (S115). In this case, since the G/O priority of the printer PR is higher than the G/O priority of the terminal apparatus TA, namely, the Intent value of the printer PR is higher than the Intent value of the terminal apparatus TA, the printer PR shifts to the G/O state and the terminal apparatus TA shifts to the CL state.

In T128, the printer PR performs the first connection sequence with the terminal apparatus TA, and establishes a connection with the terminal apparatus TA (S116). Thereby, the printer PR can allow the terminal apparatus TA to participate as a CL apparatus in the WFDNW in which the printer PR operates as a G/O apparatus.

In the case B also, similarly as in the case A of FIG. 6, compared to a configuration of a comparison example, the user can easily establish a connection between the printer PR and the terminal apparatus TA. Particularly, in the case B, the user may easily establish a connection between the printer PR which is a device apparatus and the terminal apparatus TA.

Case C

FIG. 8

In this case, the printer PR is a G/O apparatus and forms the WFDNW having the SSID "XXX". The number of connections of the printer PR is less than the upper limit number. T202 to T214 are similar to T2 to T14 of FIG. 6. The user does not select the OK button 102 in the first inquiry image 100 displayed in the printer PR in T214. In T216, the user selects the SSID "XXX" on the selection display 300 displayed in the terminal apparatus TA. In this case, in T218, the terminal apparatus TA sends the Provision Discovery Req. signal to the printer PR.

The printer PR, in a case of receiving the Provision Discovery Req. signal from the terminal apparatus TA (YES in S202 of FIG. 4), in T220, displays the second inquiry image 200 in place of the first inquiry image 100 (S204). In T222, the user selects the OK button 202 in response to the second inquiry image 200 (OK in S206). In this case, in T226, the printer PR establishes a connection with the terminal apparatus TA by performing a second connection sequence with the terminal apparatus TA (S208). In the second connection sequence, by communication of the Provision Discovery Res. signal being performed, the terminal apparatus TA shifts to the CL state. Thereby, the printer PR can allow the terminal apparatus TA to participate as a CL apparatus in the WFDNW in which the printer PR operates as a G/O apparatus.

As described above, the printer PR, in a case where the OK button 102 is not selected by the user in response to the first inquiry image 100 and the Provision Discovery Req. signal is received from the terminal apparatus TA (T218), displays the second inquiry image 200 (T220). Next, the printer PR, when the OK button 202 is selected by the user in response to the second inquiry image 200 (T222), establishes a connection with the terminal apparatus TA (T226). Consequently, the printer PR, even when the OK button 102 is not selected by the user in response to the first inquiry image 100, can appropriately establish a connection with the terminal apparatus TA.

Case D

FIG. 9

In this case, the printer PR is a device apparatus. T302 to T314 are similar to T102 to T114 of FIG. 7. The user does not select the OK button 102 in the first inquiry image 100 displayed in the printer PR in T314. In T316, the user selects the device name "AAA" on the selection display 310 displayed in the terminal apparatus TA. In this case, in T318, the terminal apparatus TA sends the G/O Nego. Req. signal to the printer PR.

Figure 8:
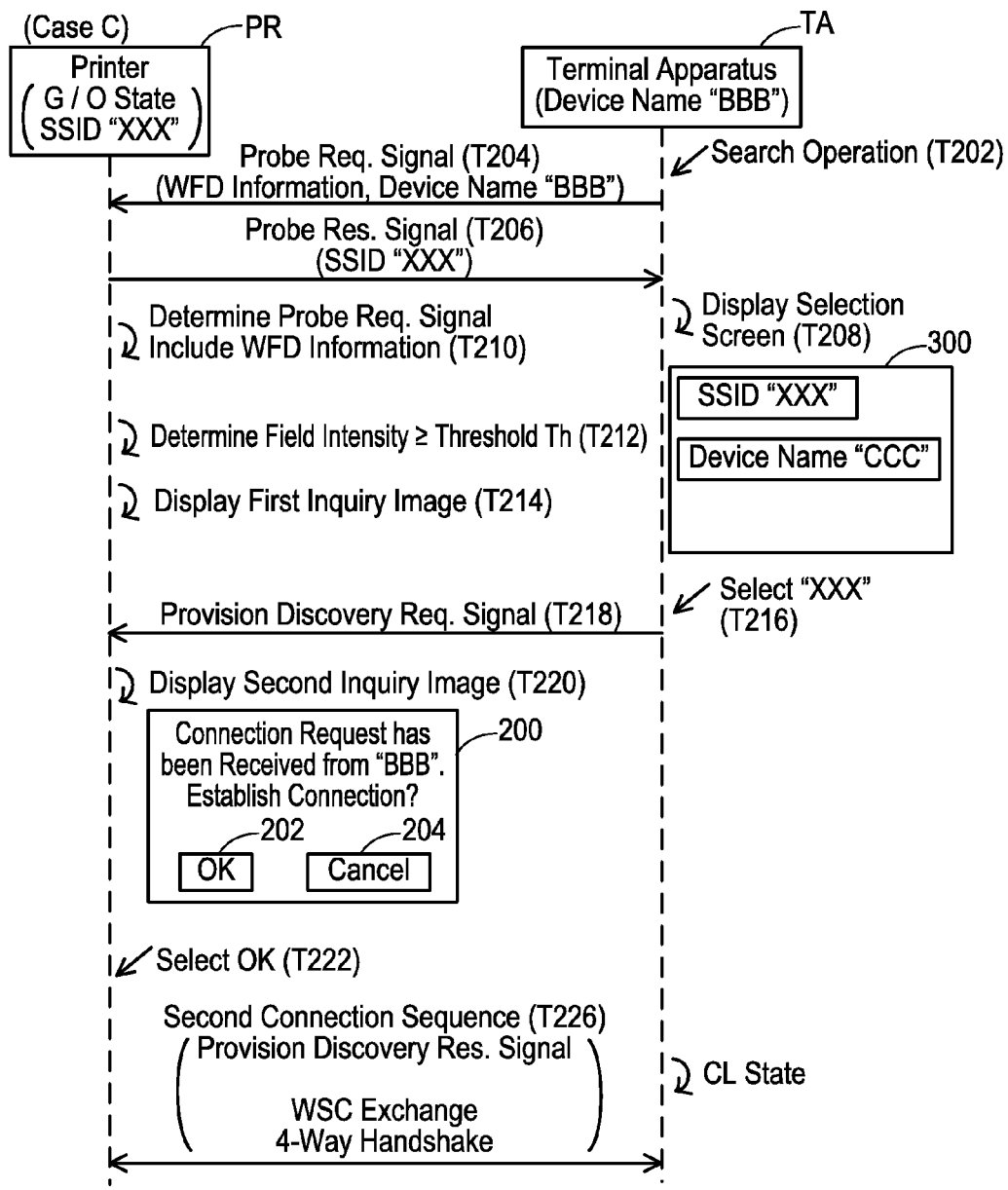
FIG. 8 illustrates a sequence diagram of a case C where the printer is in the G/O state.
Figure 9:
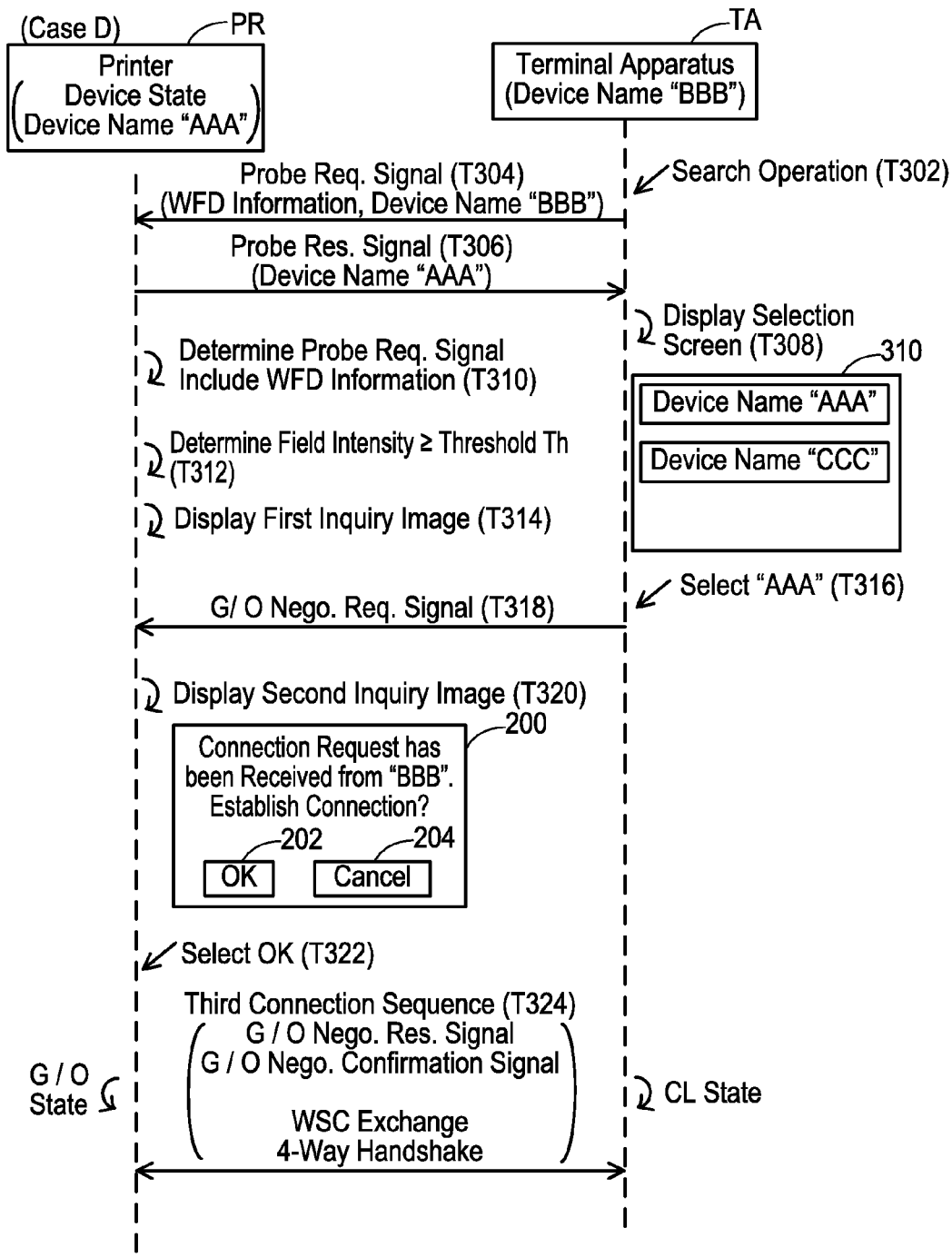
FIG. 9 illustrates a sequence diagram of a case D where the printer is in the device state.

T320, T322 are similar to T220, T222 of FIG. 8. In T324, the printer PR executes a third connection sequence with the terminal apparatus TA, and establishes a connection with the terminal apparatus TA (S216 of FIG. 4). In the third connection sequence, by communication between the G/O Nego. Res. signal and the G/O Nego. Confirmation signal being performed, the printer PR shifts to the G/O state and the terminal apparatus TA shifts to the CL state. Thereby, the printer PR can allow the terminal apparatus TA to participate as a CL apparatus in the WFDNW in which the printer PR operates as a G/O apparatus.

As described above, the printer PR, in a case where the OK button 102 is not selected by the user in response to the first inquiry image 100 and the G/O Nego. Req. signal is received (T318), displays the second inquiry image 200 (T320). Next, the printer PR, in a case where the OK button 202 is selected by the user in response to the second inquiry image 200 (T322), establishes a connection with the terminal apparatus TA (T324). The printer PR, even in a case where the OK button 102 is not selected by the user in response to the first inquiry image 100, can appropriately establish a connection with the terminal apparatus TA.

(Correspondence Relationship)

The printer PR and the terminal apparatus TA are examples of "communication apparatus" and "external apparatus", respectively. A G/O apparatus and a CL apparatus are examples of "parent station" and "child station" respectively. The device state is one example of "state where the communication apparatus does not operate as either the parent station or the child station of a wireless network". The Probe Req. signal received in S2 of FIG. 2 is one example of "apparatus search signal". The Invitation Req. signal is one example of "invitation signal". The Provision Discovery Req. signal received in S202 of FIG. 4 and the G/O Nego. Req. signal received in S210 are examples of "connection request signal different from the apparatus search signal".

A WFDNW that was formed in a case of YES in S104 of FIG. 3 is one example of "first wireless network". A WFDNW, formed in S112 to S115, in which the printer PR operates as a G/O apparatus, is one example of "second wireless network". A WFDNW, formed in S112 to S115, in which the terminal apparatus TA operates as a G/O apparatus is one example of "third wireless network". A WFDNW, formed in S216 of FIG. 4, in which the printer PR operates as a G/O apparatus, is one example of "fifth wireless network". A WFDNW, formed in S216, in which the terminal apparatus TA operates as a G/O apparatus, is one example of "sixth wireless network". A WFDNW that was formed in a case of YES in S232 of FIG. 5 is one example of "seventh wireless network". A message included in the first inquiry image 100 and a message included in the second inquiry image 200 are examples of "first inquiry message" and "second inquiry message", respectively. The WFD scheme, the WFD information, the threshold Th are examples of "predetermined wireless communication scheme", "support information", and "predetermined value", respectively. The SSID "XXX" and the device name "AAA" are examples of "identification information".

A process of S16 of FIG. 2 is one example of "causing the display to display a first inquiry message". Processes of S106 to S116 of FIG. 3 are examples of "establishing the particular wireless connection in response to the first inquiry message". Processes of S204, S212 of FIG. 4 are examples of "causing the display to display a second inquiry message". Processes of S208, S216 are examples of "establishing the particular wireless connection in response to the second inquiry message".

Second Embodiment

As illustrated in FIG. 1, in the present embodiment, the memory 34 of the printer PR may further store a piece of Persistent information 38. The Persistent information 38 is information concerning connections established by the printer PR in the past, namely, information concerning a connection history of the printer PR. For instance, in a case where a connection between the printer PR and the terminal apparatus TA which is a WFD apparatus had been established in the past, namely, the printer PR and the terminal apparatus TA had belonged to a same WFDNW in the past, the Persistent information 38 includes the MAC address "bbb" of the terminal apparatus TA, a SSID "YYY" of the above WFDNW, a password "ppp" of the above WFDNW, and status information. The status information is information indicating whether the printer PR was in the G/O state or in the CL state in the WFDNW. Although an illustration is omitted, the terminal apparatus TA may store the Persistent information. Status information included in the Persistent information is information indicating whether the terminal apparatus TA was in the G/O state or in the CL state in the above WFDNW.

(First Monitoring Process)

Figure 10:
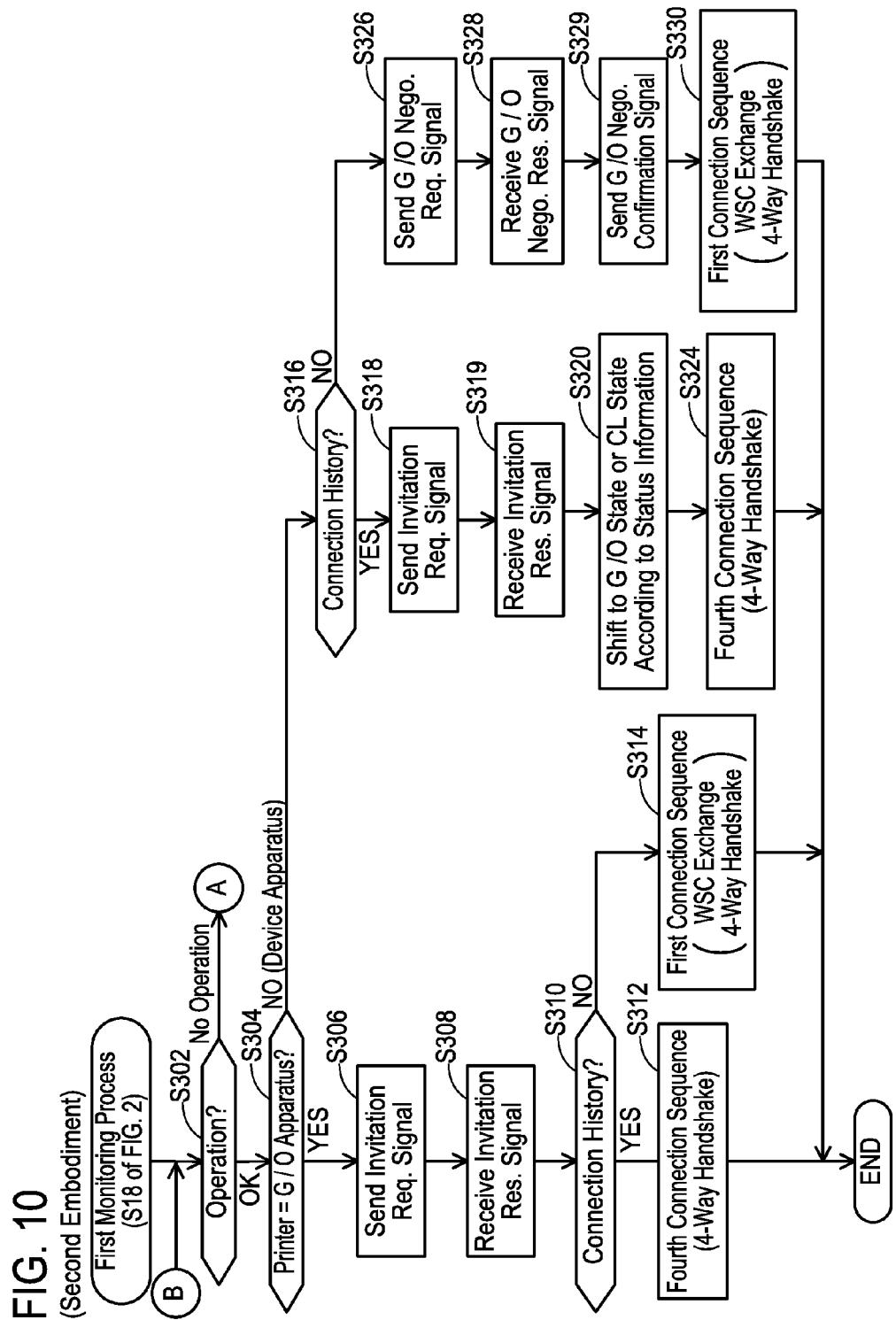
FIG. 10 illustrates a flow chart of a first monitoring process of a second embodiment.

In the present embodiment, in place of the first monitoring process of FIG. 3, a first monitoring process of FIG. 10 is executed. S302 to S308 are similar to S102 to S108 of FIG. 3.

In S310, the CPU 32 determines whether a connection history with the terminal apparatus TA exists. Particularly, the CPU 32 determines whether a connection history indicating that the terminal apparatus TA had participated in the past as a CL apparatus in a WFDNW (hereinafter referred to as "current WFDNW") currently formed by the printer PR exists. Specifically, the CPU 32 first specifies the MAC address "bbb" of the terminal apparatus TA included in the Probe Req. signal received from the terminal apparatus TA of S2 of FIG. 2. In a case where the Persistent information 38 (hereinafter referred to as "specific Persistent information") including the specified MAC address "bbb" is stored in the memory 34, and the SSID "YYY" included in the specific Persistent information is identical to the SSID of the current WFDNW, the CPU 32 determines YES in S310, and proceeds to S312. On the other hand, in a case where the specific Persistent information is not stored in the memory 34, or, in a case where the specific Persistent information is stored in the memory 34 but the SSID "YYY" included in the specific Persistent information is not identical to the SSID of the current WFDNW, the CPU 32 determines NO in S310, and proceeds to S314. S314 is similar to S116 of FIG. 3. When S314 is finished, the first monitoring process is finished.

In S312, the CPU 32 executes a fourth connection sequence with the terminal apparatus TA, and establishes a connection with the terminal apparatus TA. Specifically, the CPU 32 does not execute the WCS Exchange, namely, does not send the password and such of the current WFDNW to the terminal apparatus TA, and executes the 4-Way Handshake with the terminal apparatus TA. The reason why the CPU 32 does not send the password and such of the current WFDNW to the terminal apparatus TA is as follows. Namely, the terminal apparatus TA had belonged to the current WFDNW as a CL apparatus in the past, and stores the Persistent information including the password and such of the current WFDNW. Therefore, the terminal apparatus TA can establish a connection with the printer PR even without obtaining the password and such of the current WFDNW from the printer PR. Consequently, since the WCS Exchange is not executed, a connection between the printer PR and the terminal apparatus TA is rapidly established, and further, the communication load between the printer PR and the terminal apparatus TA is reduced. When S312 is finished, the first monitoring process is finished.

In a case where the printer PR is a device apparatus, in S316, the CPU 32 determines whether a connection history with the terminal apparatus TA exists. The CPU 32 specifies the MAC address "bbb" of the terminal apparatus TA, and, in a case where the specific Persistent information including the specified MAC address "bbb" is stored in the memory 34, determines YES in S316, and proceeds to S318, and, in a case where the specific Persistent information 38 is not stored in the memory 34, determines NO in S316, and proceeds to S326. S326 to S330 are similar to S112 to S116 of FIG. 3. When S330 is finished, the first monitoring process is finished.

S318, S319 are similar to S306, S308. In S320, the CPU 32 shifts the operating state of the printer PR from the device state to the G/O state or the CL state in accordance with the status information included in the specific Persistent information. Specifically, in a first case where the status information indicates the G/O state, the CPU 32 shifts the operating state of the printer PR from the device state to the G/O state, and forms the WFDNW in which the printer PR operates as a G/O apparatus. The first case is a case where the printer PR belongs to the WFDNW to which the printer PR and the terminal apparatus TA had belonged as G/O apparatuses in the past, and the terminal apparatus TA belonged to the WFDNW as a CL apparatus. In the first case, the terminal apparatus TA shifts the operating state of the terminal apparatus TA from the device state to the CL state. On the other hand, in a second case where the status information indicates the CL state, the CPU 32 shifts the operating state of the printer PR from the device state to the CL state. In the second case, the terminal apparatus TA shifts the operating state of the terminal apparatus TA from the device state to the G/O state, and forms the WFDNW in which the terminal apparatus TA operates as a G/O apparatus. In the first and second cases, the WFDNW formed in S320 is the same WFDNW as the WFDNW to which the printer PR and the terminal apparatus TA had belonged in the past. In the first and second cases, the CPU 32 uses the password "ppp" included in the specific Persistent information as a password of a WFDNW (hereinafter referred to as "new WFDNW") to be newly formed, and uses a SSID "YYY" included in the specific Persistent information as a SSID of the new WFDNW. The CPU 32 uses an authentication method included in the specific Persistent information as an authentication scheme of the new WFDNW, and uses an encryption scheme included in the specific Persistent information as an encryption scheme of the new WFDNW.

S324 is similar to S312. Namely, since the printer PR and the terminal apparatus TA store the Persistent information including the password and such of the new WFDNW, a connection can be established even without executing communication of the password and such. Therefore, a connection between the printer PR and the terminal apparatus TA is rapidly established, and moreover communication load between the printer PR and the terminal apparatus TA is reduced. When S324 is finished, the first monitoring process is finished.

Specific Case

FIG. 11, FIG. 12

Figure 11:
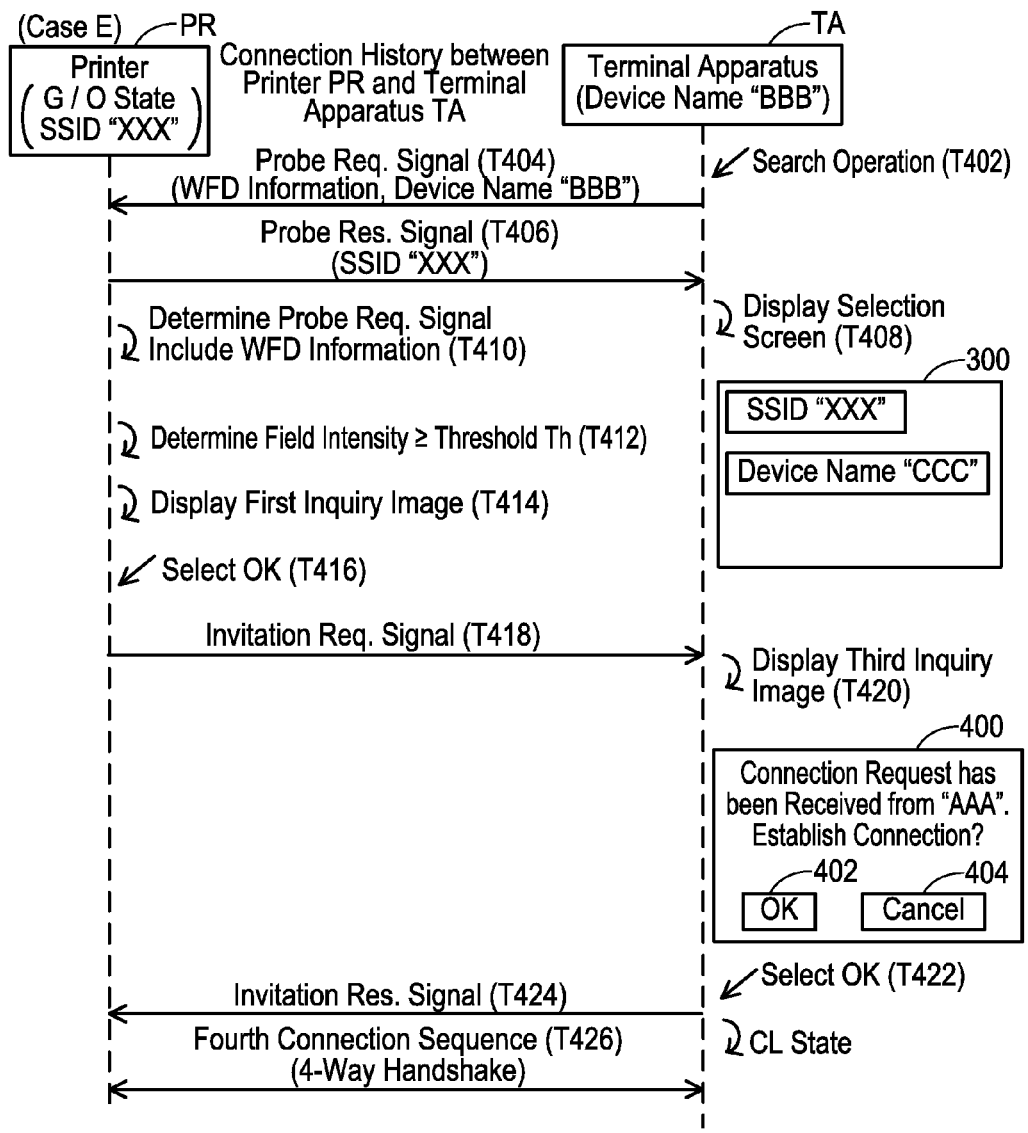
FIG. 11 illustrates a sequence diagram in a case E where the printer in the G/O state stores Persistent information.
Figure 12:
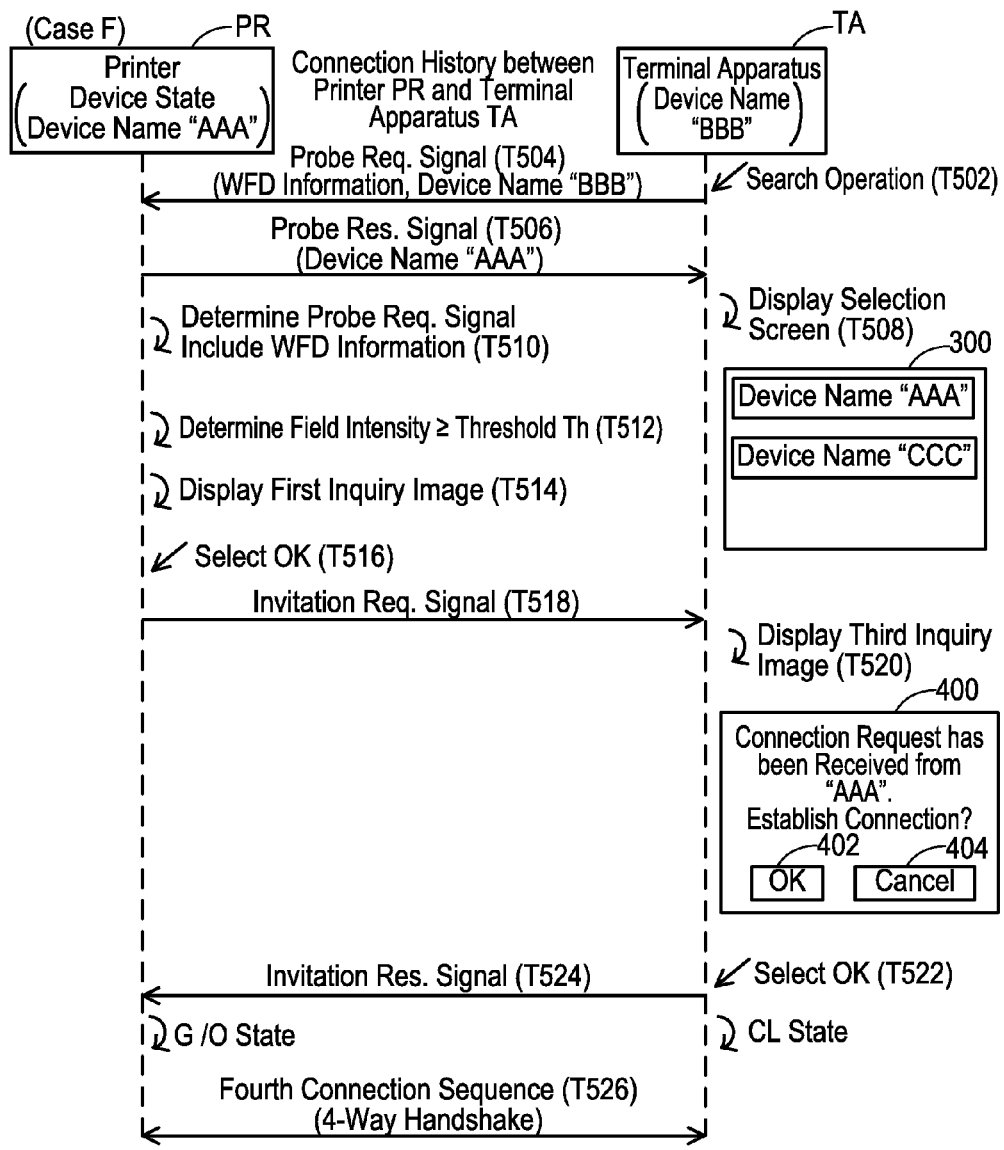
FIG. 12 illustrates a sequence diagram in a case F where the printer in the device state stores the Persistent information.

Next, with reference to FIG. 11 and FIG. 12, content of specific cases E, F achieved in accordance with flow charts in FIG. 2, FIG. 4, FIG. 5, and FIG. 10 is described. In either of the cases E, F, the terminal apparatus TA is a WFD apparatus and in the device state. In either of the cases E, F, although an illustration is omitted, a specific apparatus having the device name "CCC" exists around the terminal apparatus TA.

Case E

FIG. 11

In this case, the printer PR is a G/O apparatus and forms the WFDNW having the SSID "XXX". The printer PR stores the Persistent information 38. The status information included in the Persistent information 38 indicates that the printer PR was in the G/O state. The number of connections of the printer PR is less than the upper limit number. T402 to T424 are similar to T2 to T24 of FIG. 6.

The printer PR, since the connection history with the terminal apparatus TA exists (YES in S310 of FIG. 10), in T426, executes the fourth connection sequence with the terminal apparatus TA (S312).

As described above, the printer PR, since the connection history with the terminal apparatus TA exists, executes the fourth connection sequence not including the WSC Exchange with the terminal apparatus TA (T426). Since the WCS Exchange is not executed, the connection between the printer PR and the terminal apparatus TA is rapidly established, and moreover the communication load between the printer PR and the terminal apparatus TA is reduced.

Case F

FIG. 12

In this case, the printer PR is a device apparatus, and stores the Persistent information 38. Status information included in the Persistent information 38 indicates that the printer PR is in the G/O state. T502 to T516 are similar to T102 to T116 of FIG. 7.

The printer PR, since the connection history with the terminal apparatus TA exists (YES in S316 of FIG. 10), in T518, sends the Invitation Req. signal to the terminal apparatus TA (S318). T520 to T524 are similar to T420 to T424 of FIG. 11. The printer PR, in a case of receiving the Invitation Res. signal from the terminal apparatus TA (S319), shifts to the G/O state (S320). The terminal apparatus TA shifts to the CL state. T526 is similar to T426 of FIG. 11.

In this case also, similarly to the case E of FIG. 11, since the WCS Exchange is not executed, a connection between the printer PR and the terminal apparatus TA is rapidly established, moreover, the communication load between the printer PR and the terminal apparatus TA is reduced.

(Correspondence Relationship)

The Invitation Req. signal is one example of "particular signal". The new WFDNW in a case of YES in S316 of FIG. 10 is one example of "fourth wireless network". The processes of S306, S308, S312, S314, and S318 to S330 are examples of "establishing the particular wireless connection in response to the first inquiry message". The process of S310, the process of S316, and the process to form the new WFDNW in S320 are "determining whether the external apparatus has previously belonged to the first wireless network as the child station", "determining whether the external apparatus has previously belonged as a child station or a parent station to a fourth wireless network", and "reforming", respectively.

(Modification 1) In each embodiment described above, although the printer PR is a WFD apparatus, in a modification, the printer PR may not be a WFD apparatus. The CPU 32 of the printer PR, when a power supply of the printer PR is turned ON, activates so-called a SoftAP, and may operate the printer PR as a pseudo AP. In this modification, in a case where the Probe Req. signal is received from the terminal apparatus TA (YES in S2 of FIG. 2), the CPU 32 may display the first inquiry image 100 on the display unit 14 (S16). In a case where the OK button 102 in the first inquiry image 100 is selected (OK in S102 of FIG. 3), the CPU 32 may establish a connection with the terminal apparatus TA. Namely, the CPU 32 can allow the terminal apparatus TA to participate as a CL apparatus in the network in which the printer PR operates as a pseudo AP. Namely, in this modification, a SoftAP is one example of a "parent station".

(Modification 2) In each embodiment described above, although the CPU 32 of the printer PR determines whether the Probe Req. signal received in S2 of FIG. 2 includes the WFD information (S10), in a modified example, the CPU 32 may not necessarily determine it. Namely, the CPU 32 may skip S10 and proceed to S14.

(Modification 3) In each embodiment described above, although the CPU 32 of the printer PR determines whether field intensity of a carrier wave used in the communication of the Probe Req. signal received in S2 of FIG. 2 is equal to or more than the threshold Th (S14), in a modification, the CPU 32 may not determine it. Namely, the CPU 32 may skip S14 and proceed to S16. In a modification made by combining the modifications 2 and 3, the CPU 32 may not necessarily perform the second monitoring process of S20.

(Modification 4) In each embodiment described above, "communication apparatus" is not limited to the printer PR capable of performing a printing function, may be a scanner capable of performing a scanning function. The "communication apparatus" may be an apparatus such as a PC, a server, a portable terminal (a mobile phone, a smart phone, a PDA. and such) that performs functions different from the printing function and the scanning function such as an image display function and a data calculation function. Namely, "communication apparatus" includes all devices with which a wireless connection may be established.

(Modification 5) In each embodiment described above, by the CPU 32 of the printer PR performing a program (namely, software), each kind of the processes of FIG. 2 to FIG. 5, and FIG. 10 is achieved. In place of this, at least one process among the processes of FIG. 2 to FIG. 5, and FIG. 10 may be achieved by hardware such as a logic circuit.

What is claimed is:

1. A communication apparatus comprising:
   a display;
   a processor; and
   a memory storing computer-readable instructions therein, the computer-readable instructions, when executed by the processor, causing the communication apparatus to perform:
   receiving an apparatus search signal from an external apparatus in a case where a search operation is performed by a user on the external apparatus, the apparatus search signal being sent from the external apparatus for searching an apparatus of a target with which the external apparatus is to establish a wireless connection;
   causing the display to display a first screen including a first inquiry message in a case where the apparatus search signal is received from the external apparatus and a first condition is satisfied, the first inquiry message being for inquiring of the user whether a particular wireless connection is to be established between the communication apparatus which received the apparatus search signal and the external apparatus which sent the apparatus search signal;
   establishing the particular wireless connection between the communication apparatus and the external apparatus in a case where the user selects, in response to the first inquiry message, that the particular wireless connection is to be established,
   causing the display to display a second screen including a second inquiry message different from the first inquiry message, in a case where the user does not select, in response to the first inquiry message, that the particular wireless connection is to be established, and a connection request signal different from the apparatus search signal is received from the external apparatus, the connection request signal being sent from the external apparatus to the communication apparatus in a case where identification information for identifying the communication apparatus is selected by the user in the external apparatus under a state where a selection screen including the identification information is displayed in the external apparatus, the second inquiry message being for inquiring of the user whether the particular wireless connection is to be established in response to the connection request signal; and
   establishing the particular wireless connection, in a case where the user selects, in response to the second inquiry message, that the particular wireless connection is to be established.

2. The communication apparatus as in claim 1, wherein in a case where the user selects, in response to the first inquiry message, that the particular wireless connection is to be established, under a state where a first wireless network in which the communication apparatus operates as a parent station has been formed, the establishing in response to the first inquiry message includes establishing the particular wireless connection by sending, to the external apparatus, an invitation signal for inviting the external apparatus as a child station to the first wireless network.

3. The communication apparatus as in claim 2, wherein:
the computer-readable instructions, when executed by the processor, cause the communication apparatus to further perform:
  determining whether the external apparatus has previously belonged to the first wireless network as the child station, in the case where the user selects, in response to the first inquiry message, that the particular wireless connection is to be established, under the state where the first wireless network has been formed, and
the establishing the particular wireless connection in response to the first inquiry message includes:
  establishing the particular wireless connection by sending, to the external apparatus, a password being used in the first wireless network, in a case where it is determined that the external apparatus has never belonged to the first wireless network as the child station; and
  establishing the particular wireless connection without sending the password to the external apparatus, in a case where it is determined that the external apparatus had previously belonged to the first wireless network as the child station.

4. The communication apparatus as in claim 1, wherein:
the first screen is displayed, in a case where the apparatus search signal is received from the external apparatus and the first condition is satisfied, the first condition including a condition in which a first wireless network in which the communication apparatus operates as a parent station has been formed, and a condition in which a number of wireless connections currently established by the communication apparatus is less than an upper limit number,
the first screen is not displayed, in a case where the apparatus search signal is received from the external apparatus and a second condition is satisfied without the first condition being satisfied, the second condition including a condition in which the first wireless network has been formed and a condition in which the number of wireless connections currently established by the communication apparatus is equal to the upper limit number.

5. The communication apparatus as in claim 1, wherein
the establishing the particular wireless connection in response to the first inquiry message includes:
  executing an operation-determining communication for determining whether the communication apparatus is to operate as a parent station or a child station, in a case where the user selects, in response to the first inquiry message, that the particular wireless connection is to be established, under a state where the communication apparatus does not operate as either the parent station or the child station of a wireless network;
  in a case where it is determined, in response to a result of the operation-determining communication, that the communication apparatus is to operate as the parent station, establishing the particular wireless connection so as to cause the external apparatus to belong as a child station to a second wireless network in which the communication apparatus operates as a parent station; and
  in a case where it is determined, in response to the result of the operation-determining communication, that the communication apparatus is to operate as the child station, establishing the particular wireless connection so as to cause the communication apparatus to belong as a child station to a third wireless network in which the external apparatus operates as a parent station.

6. The communication apparatus as in claim 5, wherein
the computer-readable instructions, when executed by the processor, cause the communication apparatus to further perform:
  determining whether the external apparatus has previously belonged as a child station or a parent station to a fourth wireless network in which the communication apparatus operates as the parent station or the child station, in the case where the user selects, in response to the first inquiry message, that the particular wireless connection is to be established, under the state where the communication apparatus does not operate as either the parent station or the child station of the wireless network; and
  reforming the fourth wireless network in which the communication apparatus operates as the parent station, in a case where it is determined that the external apparatus had previously belonged to the fourth wireless network as the child station, and
wherein the establishing the particular wireless connection in response to the first inquiry message includes:
  establishing the particular wireless connection by sending, to the external apparatus, a particular signal for requiring that both the communication apparatus and the external apparatus belong to the fourth wireless network which is to be reformed by the communication apparatus, in a case where it is determined that the external apparatus had belonged to the fourth wireless network as the child station,
  establishing the particular wireless connection by sending, to the external apparatus, a particular signal for requiring that both the communication apparatus and the external apparatus belong to the fourth wireless network which is to be reformed by the external apparatus, in a case where it is determined that the external apparatus had belonged to the fourth wireless network as the parent station, and
  establishing the particular wireless connection by executing the operation-determining communication, in a case where it is determined that the external apparatus has never belonged to the fourth wireless network as either the child station or the parent station.

7. The communication apparatus as in claim 1, wherein:
the first screen is displayed, in a case where the apparatus search signal is received from the external apparatus and the first condition is satisfied, the first condition including a condition in which the apparatus search signal includes support information indicating that the external apparatus supports a predetermined wireless communication scheme,
the first screen is not displayed, in a case where the apparatus search signal is received from the external apparatus and a second condition is satisfied without the first condition being satisfied, the second condition including a condition in which the apparatus search signal does not include the support information, and
the predetermined wireless communication scheme is a wireless communication scheme for establishing a wireless network in which one of the communication apparatus and the external apparatus operates as a parent station and the other operates as a child station.

8. The communication apparatus as in claim 1, wherein:
the first screen is displayed, in a case where the apparatus search signal is received from the external apparatus and the first condition is satisfied, the first condition including a condition in which a field intensity of a carrier wave used in communicating the apparatus search signal is equal to or more than a predetermined value, and
the first screen is not displayed, in a case where the apparatus search signal is received from the external apparatus and a second condition is satisfied without the first condition being satisfied, the second condition including a condition in which the field intensity of the carrier wave is less than the predetermined value.

9. The communication apparatus as in claim 1, wherein the establishing the particular wireless connection in response to the second inquiry message includes:
executing an operation-determining communication for determining whether the communication apparatus is to operate as a parent station or a child station, in a case where the user selects, in response to the second inquiry message, that the particular wireless connection is to be established, under a state where the communication apparatus does not operate as either the parent station or the child station of a wireless network;
establishing the particular wireless connection so as to cause the external apparatus to belong as a child station to a fifth wireless network in which the communication apparatus operates as a parent station, in a case where it is determined that the communication apparatus is to operate as the parent station in response to a result of the operation-determining communication; and
establishing the particular wireless connection so as to cause the communication apparatus to belong as a child station to a sixth wireless network in which the external apparatus operates as a parent station, in a case where it is determined that the communication apparatus is to operate as the child station in response to the result of the operation-determining communication.

10. The communication apparatus as in claim 1, wherein the establishing the particular wireless connection in response to the second inquiry message includes establishing the particular wireless connection so as to cause the external apparatus to belong as a child station to a seventh wireless network, in a case where it is selected by the user, in response to the second inquiry message, that the particular wireless connection is to be established, under a state where the seventh wireless network in which the communication apparatus operates as a parent station has been formed.

11. The communication apparatus as in claim 1, wherein the first inquiry message includes first identification information for identifying the external apparatus which sends the apparatus search signal and does not include second identification information for identifying one or more other apparatuses which do not send the apparatus search signal.

12. A non-transitory computer-readable storage medium storing computer-readable instructions for a communication apparatus,
wherein the computer-readable instructions, when executed by a processor of the communication apparatus, cause the communication apparatus to perform:
receiving an apparatus search signal from an external apparatus in a case where a search operation is performed by a user on the external apparatus, the apparatus search signal being sent from the external apparatus for searching an apparatus of a target with which the external apparatus is to establish a wireless connection;
causing a display of the communication apparatus to display a first screen including a first inquiry message in a case where the apparatus search signal is received from the external apparatus and a first condition is satisfied, the first inquiry message being for inquiring of the user whether a particular wireless connection is to be established between the communication apparatus which received the apparatus search signal and the external apparatus which sent the apparatus search signal;
establishing the particular wireless connection between the communication apparatus and the external apparatus in a case where the user selects, in response to the first inquiry message, that the particular wireless connection is to be established;
causing the display to display a second screen including a second inquiry message different from the first inquiry message, in a case where the user does not select, in response to the first inquiry message, that the particular wireless connection is to be established, and a connection request signal different from the apparatus search signal is received from the external apparatus, the connection request signal being sent from the external apparatus to the communication apparatus in a case where identification information for identifying the communication apparatus is selected by the user in the external apparatus under a state where a selection screen including the identification information is displayed in the external apparatus, the second inquiry message being for inquiring of the user whether the particular wireless connection is to be established in response to the connection request signal; and
establishing the particular wireless connection, in a case where the user selects, in response to the second inquiry message, that the particular wireless connection is to be established.

13. A communication apparatus comprising:
a display;
a processor; and
a memory storing computer-readable instructions therein, the computer-readable instructions, when executed by the processor, causing the communication apparatus to perform:
receiving an apparatus search signal from an external apparatus in a case where a search operation is performed by a user on the external apparatus, the apparatus search signal being sent from the external apparatus for searching an apparatus of a target with which the external apparatus is to establish a wireless connection;
causing the display to display a first screen including a first inquiry message in a case where the apparatus search signal is received from the external apparatus, the first inquiry message being for inquiring of the user whether a particular wireless connection is to be established between the communication apparatus which received the apparatus search signal and the external apparatus which sent the apparatus search signal; and establishing the particular wireless connection between the communication apparatus and the external apparatus in a case where the user selects, in response to the first inquiry message, that the particular wireless connection is to be established, wherein the establishing the particular wireless connection in response to the first inquiry message includes:

determining whether the external apparatus has previously belonged as a child station or a parent station to a first wireless network in which the communication apparatus operates as the parent station or the child station, in a case where the user selects, in response to the first inquiry message, that the particular wireless connection is to be established, under a state where the communication apparatus does not operate as either the parent station or the child station of a wireless network;

reforming the first wireless network in which the communication apparatus operates as the parent station, in a case where it is determined that the external apparatus had previously belonged to the first wireless network as the child station, and establishing the particular wireless connection by sending, to the external apparatus, a particular signal for requiring that both the communication apparatus and the external apparatus belong to the first wireless network which is to be reformed by the communication apparatus, in a case where it is determined that the external apparatus had belonged to the first wireless network as the child station, establishing the particular wireless connection by sending, to the external apparatus, a particular signal for requiring that both the communication apparatus and the external apparatus belong to the first wireless network which is to be reformed by the external apparatus, in a case where it is determined that the external apparatus had belonged to the first wireless network as the parent station, establishing the particular wireless connection by executing an operation-determining communication for determining whether the communication apparatus is to operate as a parent station or a child station, in a case where it is determined that the external apparatus has never belonged to the first wireless network as either the child station or the parent station, in a case where it is determined, in response to a result of the operation-determining communication, that the communication apparatus is to operate as the parent station, establishing the particular wireless connection so as to cause the external apparatus to belong as a child station to a second wireless network in which the communication apparatus operates as a parent station, and in a case where it is determined, in response to the result of the operation-determining communication, that the communication apparatus is to operate as the child station, establishing the particular wireless connection so as to cause the communication apparatus to belong as a child station to a third wireless network in which the external apparatus operates as a parent station.

* * * * *